United States Patent [19]
Sato et al.

[11] Patent Number: 5,059,516
[45] Date of Patent: Oct. 22, 1991

[54] SILVER HALIDE PHOTOGRAPHIC MATERIAL

[75] Inventors: Kiyoshi Sato; Kouji Ono, both of Hino, Japan

[73] Assignee: Konica Corporation, Tokyo, Japan

[21] Appl. No.: 605,442

[22] Filed: Oct. 30, 1990

Related U.S. Application Data

[62] Division of Ser. No. 353,295, May 17, 1989, Pat. No. 4,999,282.

[30] Foreign Application Priority Data

May 18, 1988 [JP] Japan ................................ 63-121495
Jun. 27, 1988 [JP] Japan ................................ 63-158644

[51] Int. Cl.$^5$ .............................................. G03C 1/26
[52] U.S. Cl. ...................... 430/599; 430/570; 430/573; 430/574; 430/578; 430/592; 430/600; 430/603; 430/607; 430/613; 430/614; 430/615
[58] Field of Search ............... 430/570, 573, 574, 578, 430/592, 599, 600, 603, 607, 613, 614, 615

[56] References Cited

U.S. PATENT DOCUMENTS

H830    10/1990  Deguchi et al. ................. 430/603
4,681,838  7/1987  Mifune et al. .................... 430/599
4,713,321 12/1987  Mifune et al. .................... 430/599

Primary Examiner—Hoa Van Le
Attorney, Agent, or Firm—Finnegan, Henderson, Farabow, Garrett, and Dunner

[57] ABSTRACT

A silver halide photographic material that contains at least one compound represented by the general formula (2) shown below and at least one compound selected from the group consisting of the compounds represented by the general formulas (3) and (4) shown below:

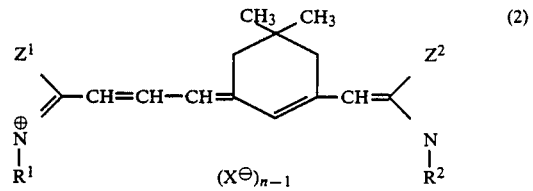

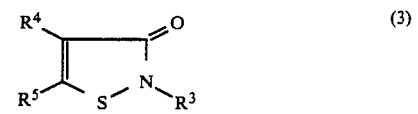

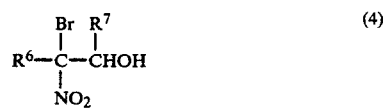

The constituents in the above formulas are clearly defined in the instant specification and claims.

11 Claims, 1 Drawing Sheet

SILVER HALIDE PHOTOGRAPHIC MATERIAL

This is a division of application Ser. No. 07/353,295, filed May 17, 1989, now U.S. Pat. No. 4,999,282.

BACKGROUND OF THE INVENTION

The present invention relates to a spectrally sensitized silver halide photographic material, more particularly to a silver halide photographic material spectrally sensitized to the near infrared region suitable for use with a lasing light source.

In medical diagnosis, an attempt is being made at performing computerized image processing on an input digital radiation image to provide data which is adapted for diagnosis, and then producing a reconstructed image by exposure with a laser beam. Various lasers including argon, helium-neon and helium-cadmium lasers have been commercialized for use as light sources in scanning exposure systems but they have several defects such as short life, bulkiness and the need to employ a complicated device for modulating radiation intensity. Compared with these lasers, semiconductor lasers are inexpensive, long lived, small in size and have the advantage of obviating the need to employ a modulator because of their capability for direct tuning. In addition, a further increase in the power and life of semiconductor lasers has been successfully realized by recent studies.

Semiconductor lasers having the features described above emit light in the near infrared range of the spectrum 750–1500 nm), so recording materials that are to be used with semiconductor lasers must have sensitivity in the near infrared range. While various methods have been known for sensitizing the silver halide in a silver halide photographic material to the near infrared portion of the spectrum, one approach is to use long-chain cyanine dyes (see The Theory of the Photographic Process, 3rd Ed., Macmillan, 1966, pp. 198–201). However, light-sensitive materials spectrally sensitized with such cyanine dyes are poor in keeping quality and will suffer from substantial desensitization unless stored at low temperatures. In order to prevent desensitization during storage, three methods may be adopted: one is to increase the concentrations of silver and hydrogen ions in the photographic emulsions used in light-sensitive materials; another way is to reduce the use of restrainers; and the third method is the combination of these two. Either method is effective in preventing desensitization but on the other hand, increased fog will occur. To avoid this problem, the following obvious methods may be adopted: the concentrations of silver and hydrogen ions are reduced; the use of restrainers is increased; or these methods is combined. However, all of these approaches suffer from the disadvantage of reduced sensitivity. It has therefore been considered difficult to prevent both increased fog and reduced sensitivity simultaneously during storage.

Light-sensitive materials spectrally sensitized to the near infrared region have the added disadvantage that when subjected to high-speed processing, for example, processing that is completed within the period of 20–60 seconds, increased fog and graininess will occur. The problem could be solved by using restrainers in a greater amount but then, as already mentioned, desensitization will occur during storage.

SUMMARY OF THE INVENTION

An object, therefore, of the present invention is to provide a spectrally sensitized silver halide photographic material that has high sensitivity not only in the virgin state but also after aging, that is improved in fog and graininess, and that will experience only negligible increase in graininess even if it is subjected to high-speed processing, for example, processing that is completed within the period of 20–60 seconds.

The object of the present invention can be attained by a silver halide photographic material having at least one layer containing a light-sensitive silver halide emulsion that is spectrally sensitized with a sensitizing dye of the following general formula (1) to light having a wavelength of 750 nm and above wherein said silver halide emulsion is prepared by a process which comprises generating silver halide grains by adding a solution of a water-soluble silver salt and a solution of a water-soluble halide to a solution containing a protective colloid, aggregating the generated silver halid grains with a polymeric flocculating agent together with the protective colloid, and removing the dissolved matter. Said silver halide photographic material is preferably for use with a lasing light source.

The above-stated object of the present invention can also be attained by a silver halide photographic material that contains at least one compound of the general formula (2) shown below and at least one compound selected from the group consisting of the compounds represented by the general formulas (3) and (4) shown below.

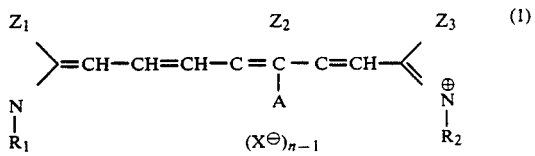

where $Z_1$ and $Z_3$ each represents the non-metallic atomic group necessary to form an optionally substituted benzothizole, benzoxazole, naphthothiazole or naphthoxazole nucleus; $R_1$ and $R_2$ each represents a saturated or unsaturated aliphatic group; $Z_2$ represents a 5- or 6-membered ring of carbon atoms; A represents a hydrogen atom when $Z_2$ is a 6-membered ring; the sensitizing dye is represented by the following general formula (1-a) when $Z_2$ is a 5-membered ring:

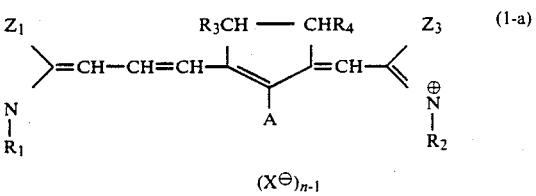

(where A is

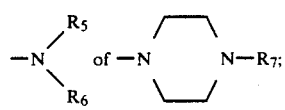

$R_3$ and $R_4$ each represents a hydrogen atom, an alkyl group having 1–4 carbon atoms, a halogen atom or an alkoxy group having 1–4 carbon atoms; $R_5$ and $R_6$ each represents an alkyl group having 1–12 carbon atoms, an alkoxycarbonylalkyl group, or an optionally substituted aryl group; $R_7$ ia an alkyl group having 1–12 carbon atoms, an aryl group having 6–10 carbon atoms, or an alkoxycarbonyl group with the alkoxy having 1–4 carbon atoms); the sensitizing dye is represented by the following general formula (1-b) when $Z_2$ is a 6-membered ring:

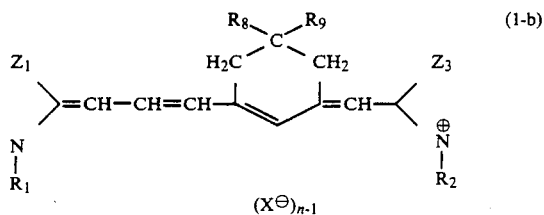

(where $R_8$ is a hydrogen atom or a methyl group; $R_9$ is a hydrogen atom, an alkyl group having 1–4 carbon atoms or a monocyclic aryl group; $X^\ominus$ is an anion; n is 1 or 2 and when an intramolecular salt is formed, n is 1);

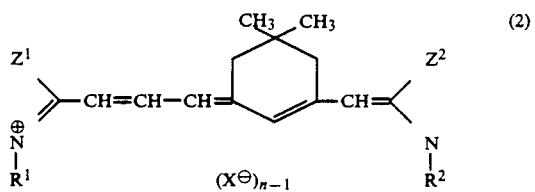

where $Z^1$ represents the non-metallic atomic group necessary to form an optionally substituted benzothiazole, benzoxazole, naphthothiazole or naphthoxazole nucleus; $Z^2$ represents the non-metallic atomic group necessary to form an optionally substituted benzothiazole nucleus; $R^1$ and $R^2$ each independently represents an alkyl group having 1–4 carbon atoms, a substitute alkyl group or an aryl group; $X^\ominus$ is an anion such as a bromide, chloride or iodide ion; n is 1 or 2 and when an intramolecular salt is formed, n is 1;

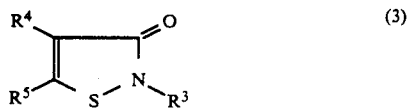

where $R^3$ represents a hydrogen atom, a straight-chained or branched alkyl group, a cyclic alkyl group, an alkenyl group, an aralkyl group, an aryl group, a heterocyclic group, an alkylamido group, an arylamido group, an alkylthioamido group, an arylthioamido group, an alkylsulfamido group or an arylsulfamido group; $R^4$ and $R^5$ each independently represents a hydrogen atom, a halogen atom, an alkyl group, a cyclic alkyl group, an aryl group, a cyano group, an alkylthio group, an arylthio group, an alkylsulfoxide group, an alkylsulfonyl group, or a heterocyclic group; provided that the alkyl groups, cyclic alkyl group, alkenyl group, heterocyclic group, aralkyl group and aryl groups represented by $R^3$, $R^4$ and $R^5$ each may have an substituent, and that $R^4$ and $R^5$ may form a ring;

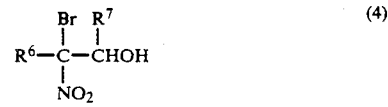

where $R^6$ is a hydrogen atom, a lower alkyl group or a hydroxymethyl group; and $R^7$ is a hydrogen atom or a lower alkyl group.

DETAILED DESCRIPTION OF THE INVENTION

Figure 1:
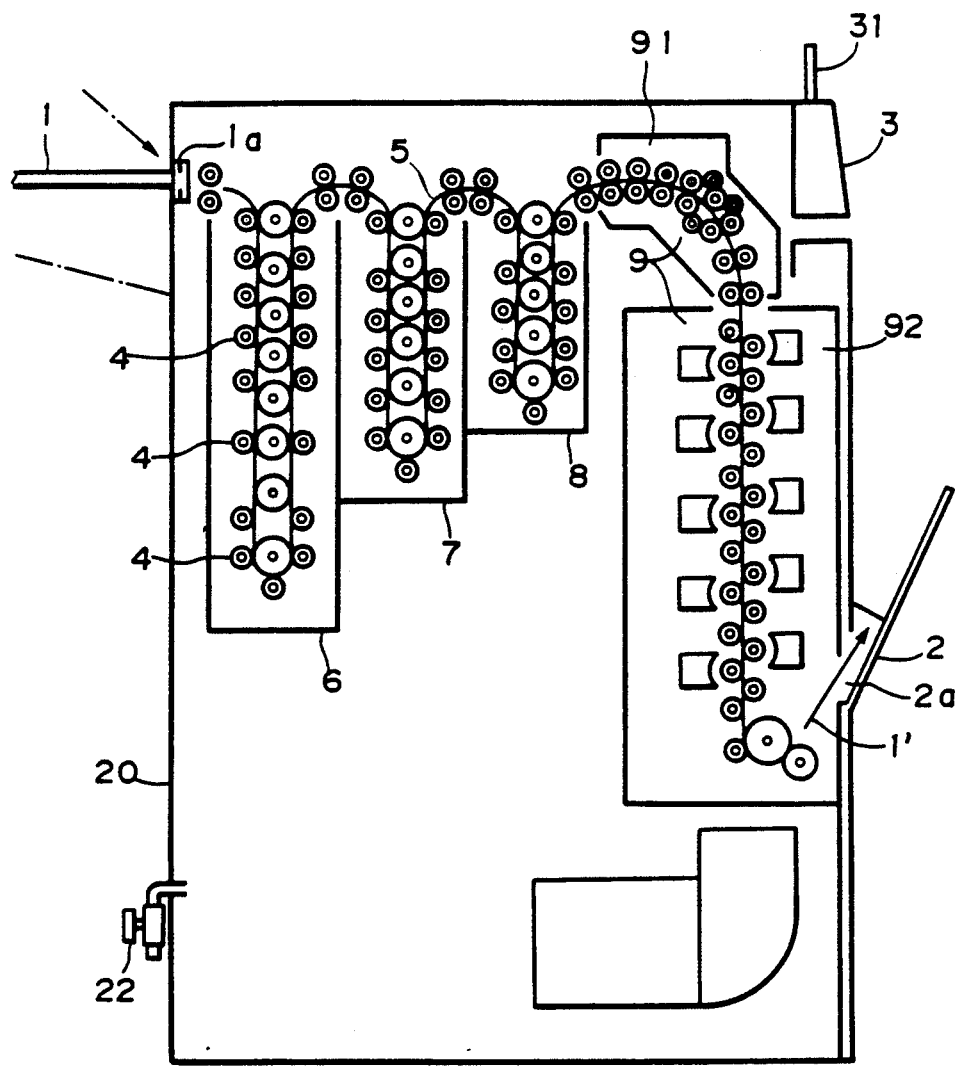
FIG. 1 shows the construction of an illustrative automatic processor that may be used in the practice of the present invention.

The infrared sensitizing dyes of the general formula (1) which are used in the present invention are first described below.

In the general formula (1), $Z_1$ and $Z_3$ each represents the non-metallic atomic group necessary to form a benzothiazole, benzoxazole, naphthothiazole or naphthoxazole nucleus, which may have a substituent such as a halogen atom, an alkyl group of 1–4 carbon atoms or an alkoxy group of 1–4 carbon atoms.

In formula (1), $R_1$ and $R_2$ each represents a saturated or unsaturated aliphatic group such as methyl, ethyl, 2-hydroxyethyl, 2-methoxyethyl, 2-acetoxyethyl, carboxymethyl, 2-carboxyethyl, 3-carboxypropyl, 4-carboxybutyl, 2-sulfoethyl, 3-sulfopropyl, 3-sulfobutyl, 4-sulfobutyl, vinylmethyl, benzyl, phenethyl, p-sulfophenethyl, n-propyl, isopropyl or n-butyl group.

In formula (1), $Z_2$ represents a 5- or 6-membered ring of carbon atoms; A represents a hydrogen atom when $Z_2$ is a 6-membered ring; when $Z_2$ is a 5- membered ring, the sensitizing dye is represented by the general formula (1-a). In formula (1-a), $R_3$ and $R_4$ each represents a hydrogen atom, an alkyl group of 1–4 carbon atoms, a halogen atom or an alkoxy group of 1–4 carbon atoms; $R_5$ an $R_6$ each represents an alkyl group of 1–12 carbon atoms, an alkoxycarbonylalkyl group (e.g. methoxycarbonylmethyl or ethoxycarbonylethyl), or an optionally substituted aryl group (e.g. phenyl, m-tolyl, p-tolyl, m-chlorophenyl, p-chlorophenyl, or m- or p-alkoxyphenyl with the alkoxy having 1–4 carbon atoms); $R_7$ represents an alkyl group of 1–12 carbon atoms, an aryl group of 6–10 carbon atoms, or an alkoxycarbonyl group of 1–4 carbon atoms).

When $Z_2$ is a 6-membered ring, the sensitizing dye is represented by the general formula (1-b). In formula (1-b), $R_8$ is a hydrogen atom or a methyl group; $R_9$ is a hydrogen atom, an alkyl group of 1–4 carbon atoms or a monocyclic aryl group; $X^\ominus$ is an anion (e.g. chloride ion, bromide ion, iodide ion, perchloric acid, benzene sulfonate, p-toluene sulfonate, methyl sulfate, ethyl sulfate or tetrafluoroboric acid).

In formula (1), n is 1 or 2 and when an intramolecular salt is formed, n is 1.

Typical examples of the compound represented by the general formula (1) are listed below.

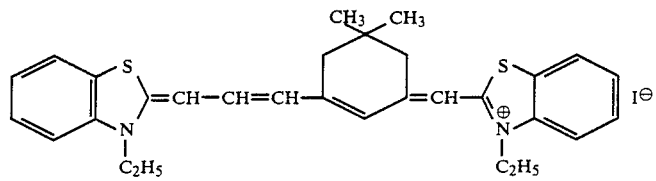
1
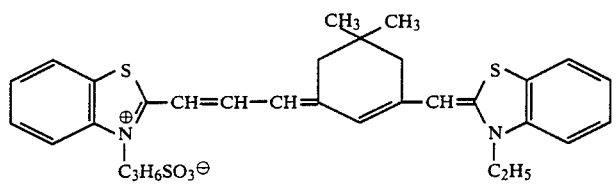
2
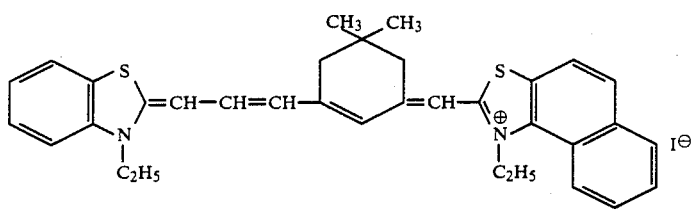
3
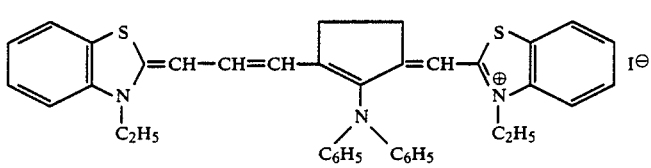
4
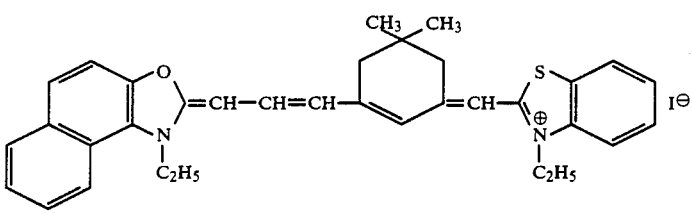
5
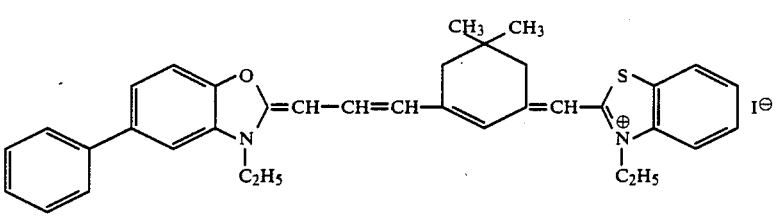
6
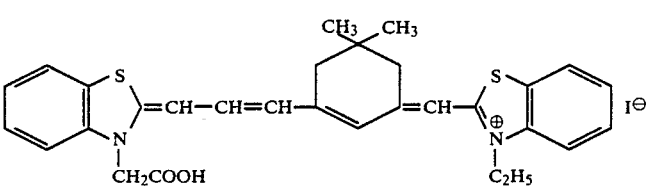
7
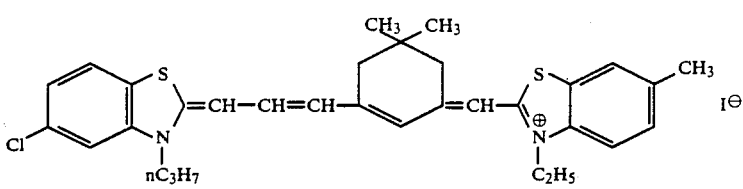
8

9
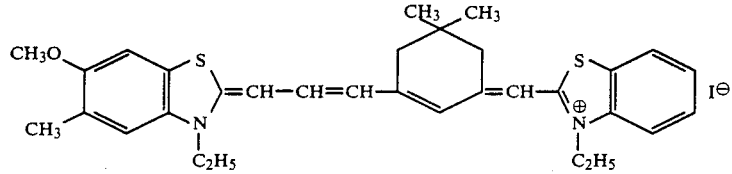
10
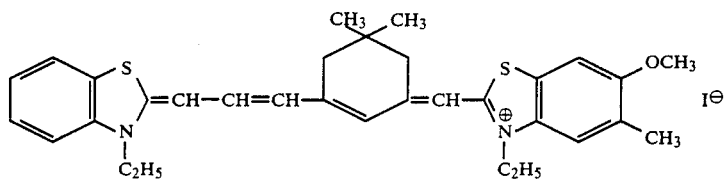
11
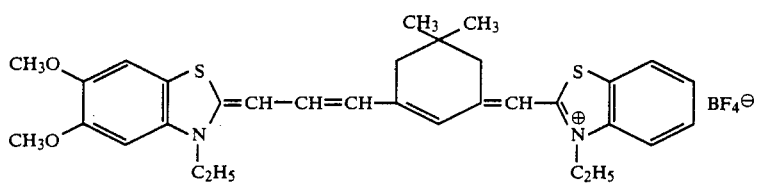
12
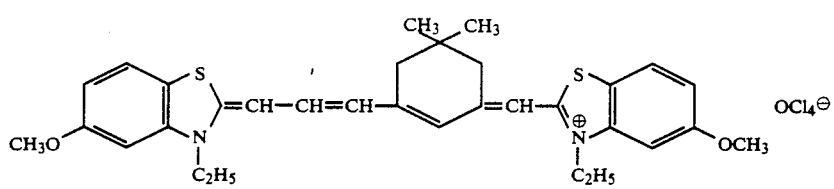
13
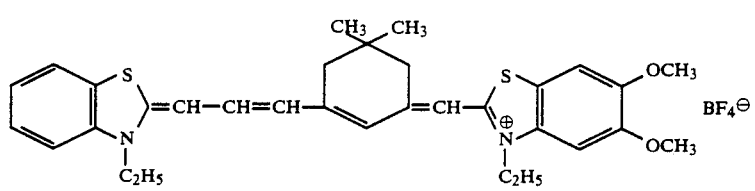
14
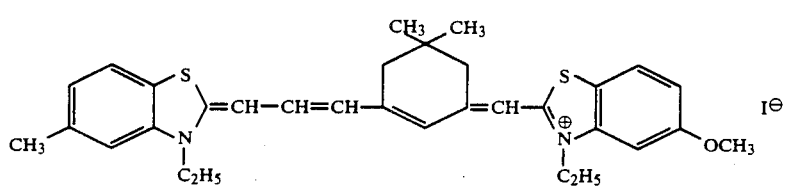
15
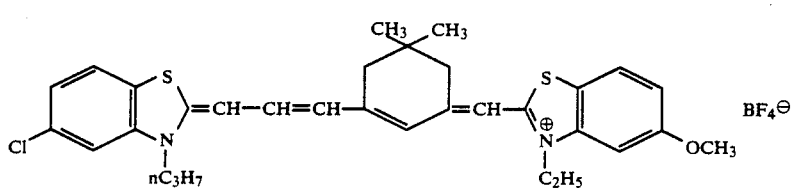
16
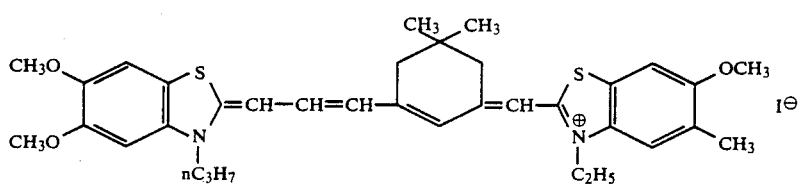
17
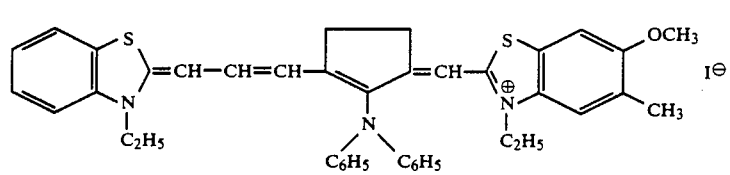

-continued
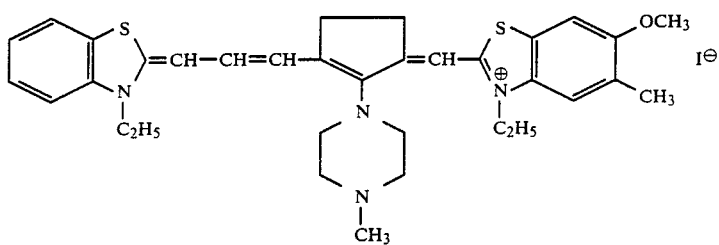
18
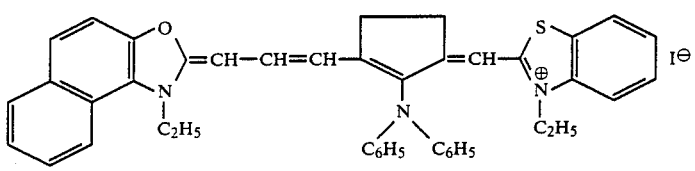
19
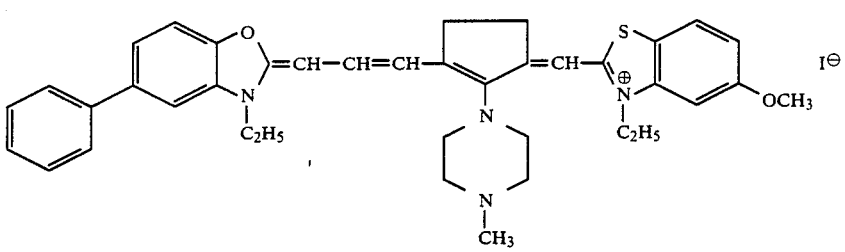
20
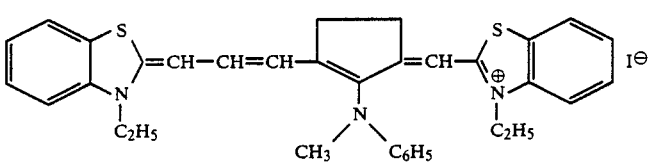
21
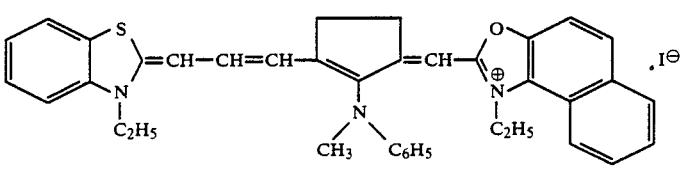
22
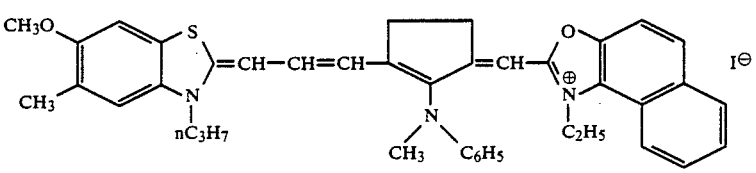
23
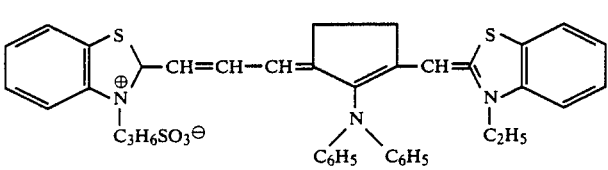
24
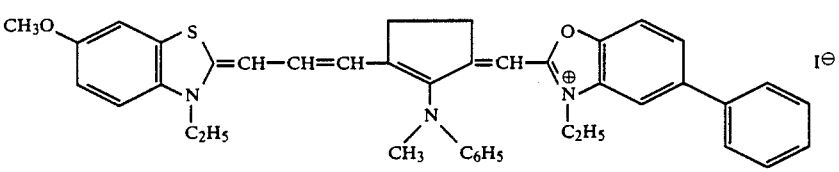
25

-continued
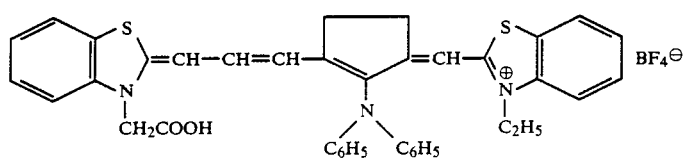 26
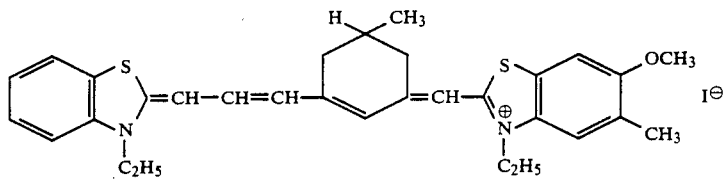 27
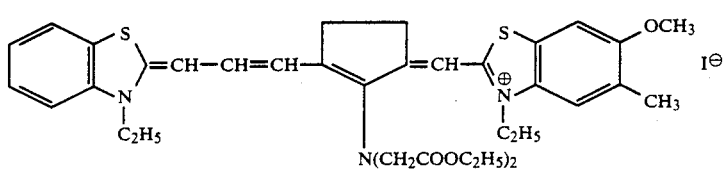 28
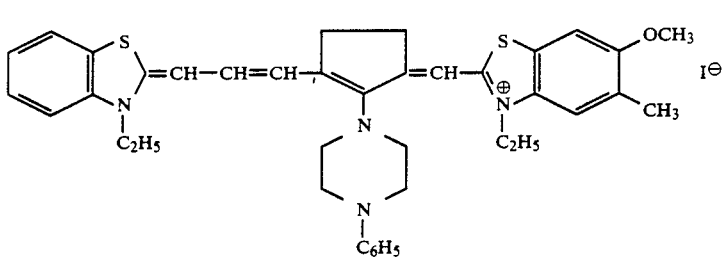 29
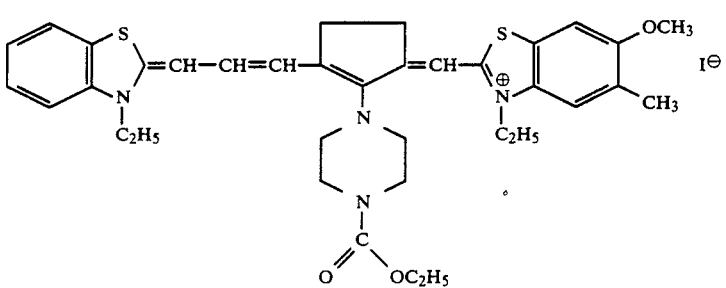 30
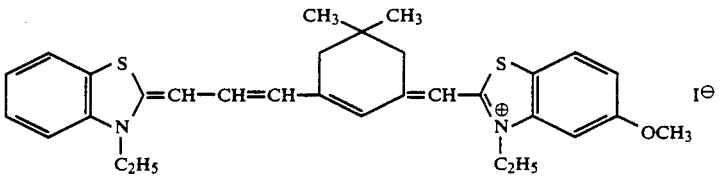 31
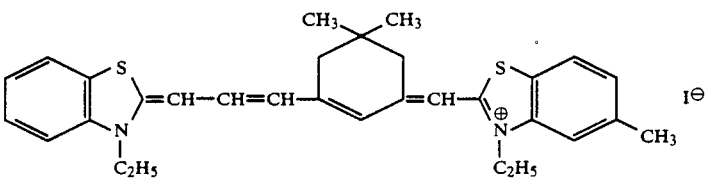 32
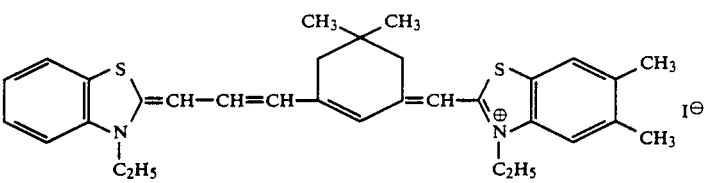 33

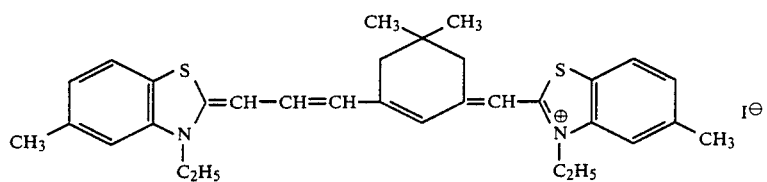
34
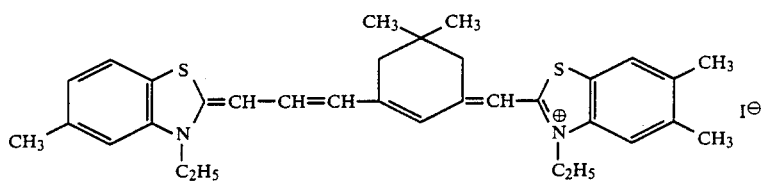
35
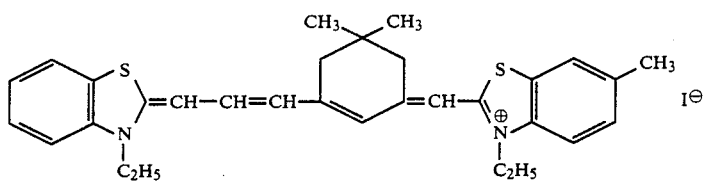
36
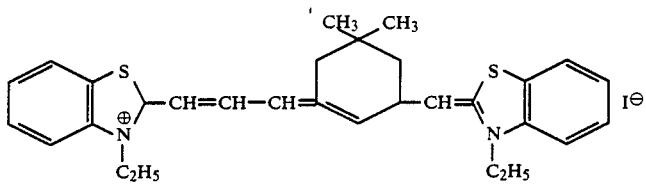
37
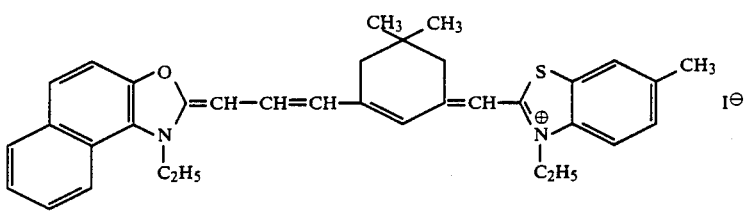
38
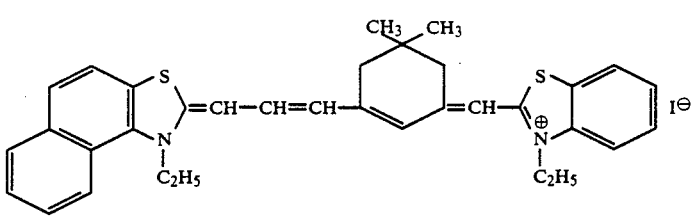
39
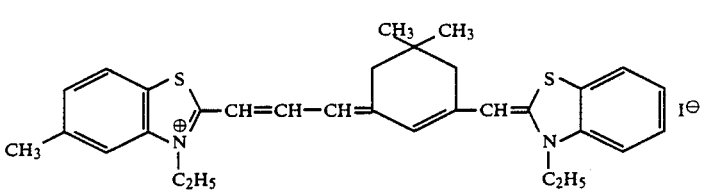
40
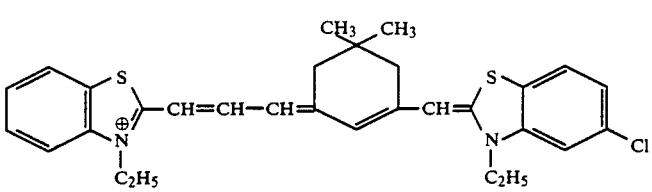
41

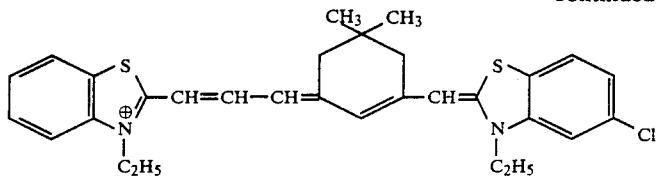

42

The dyes of formula (1) are used in amounts that range preferably from 0.003 to 0.3 g, more preferably from 0.005 to 0.15 g, per mole or silver halide, with the range of 0.01–0.15 g being particularly preferred.

These dyes of the present invention can be readily synthesized by known methods such as those described in U.S. Pat. Nos. 2,734,900, 3,482,978 and 3,758,461.

These dyes of the present invention may be dispersed directly into emulsions. Alternatively, they may be added to emulsions after being dissolved in suitable solvents such as methyl alcohol, ethyl alcohol, methyl cellosolve, acetone, water, pyridine and mixtures thereof. Dissolution of the dyes may be accomplished by sonication. Various methods may be adopted to incorporate the dyes of the present invention into emulsions and several examples are listed below: a dye is dissolved in a volatile organic solvent and the resulting solution is dispersed in a hydrophilic colloid, followed by addition of the dispersion to an emulsion (see U.S. Pat. No. 3,469,987); a water-insoluble dye is dispersed, rather than dissolved, in a water-soluble solvent, and the resulting dispersion is added to an emulsion [see JP-B-46-24185 (the term "JP-B" as used herein means an "examined Japanese patent publication")]; a dye is dissolved in a surfactant and the resulting solution is added to an emulsion (see U.S. Pat. No. 3,822,135); a solution of a compound that effects red shift is added to an emulsion [see JP-A-51-74624 (the term "JP-A" as used herein means an "unexamined published Japanese patent publication")]; a dye is dissolved in a substantially anhydrous acid and the resulting solution is added to an emulsion (see JP-A-50-80826). Other methods that may be employed to add dyes to emulsions are described in U.S. Pat. Nos. 2,912,343, 3,342,605, 2,986,287 and 3,429,835.

The dyes of the present invention may be added to silver halide emulsions before they are coated on appropriate base supports. While the dyes of the present invention may be added at any stage of the preparation of silver halide emulsions, they are preferably added in the period from chemical ripening to coating operations. It is particularly preferred to add the dyes during chemical ripening.

The silver halide photographic material of the present invention contains a silver halide emulsion that is prepared by a process which comprises generating silver halide grains by adding a solution of a water-soluble silver salt and a solution of a water-soluble halide to a solution containing a protective colloid, aggregating the generated silver halide grains with a polymeric flocculating agent together with the protective colloid, and removing the dissolved matter. The silver halide emulsion thus prepared is hereinafter called "the emulsion of the present invention" as this is considered appropriate.

The emulsion of the present invention is incorporated in at least one emulsion layer in the photographic material of the present invention. Preferably, two or more emulsion layers present, more preferably, all of these emulsion layers, contain the emulsion of the present invention.

An illustrative method for preparing the emulsion of the present invention may comprise the following steps: a solution of a water-soluble silver salt and a solution of a water-soluble halide are added to a solution containing a protective colloid; the so generated silver halide grains are aggregated in the suspension with a polymeric flocculating agent together with the protective colloid, and the dissolved matter is removed from the suspension.

The term "a solution containing a protective colloid" as used hereinabove means an aqueous solution in which a protective colloid is formed with the aid of a certain substance that is capable of providing gelatin or other hydrophilic colloids (e.g., a substance that can serve as a binder). A preferred example of such a solution is an aqueous solution containing a colloidal protective gelatin.

If gelatin is to be used as the protective colloid in the practice of the present invention, the gelatin may be lime- or acid-processed. For details of the manufacture of gelatin, see A. Veis, "The Macromolecular Chemistry of Gelatin" in B. L. Horecker, N. D. Kaplan and H. E. Scheraga, eds., Molecular Biology, Vol. V, Academic Press, Inc., New York, 1964.

If gelatin is to be used as a protective colloid, those having jelly strengths of at least 200 as measured by PAGI Method are preferred.

Various hydrophilic colloids other than gelatin may be used as protective colloids and they include: proteins such as gelatin derivatives, graft copolymers of gelatin and other polymers, albumin and casein; cellulose derivatives such as hydroxyethyl cellulose, carboxymethyl cellulose and cellulose sulfate esters; saccharide derivatives such as sodium alginate and starch derivatives; and various synthetic hydrophilic polymers including homopolymers and copolymers as illustrated by polyvinyl alcohol, partially acetalized polyvinyl alcohol, poly-N-vinylpyrrolidone, polyacrylic acid, polymethacrylic acid, polyacrylamide, polyvinylimidazole and polyvinylpyrazole.

Photographic constituent layers such as protective layers, backing layers and intermediate layers may be formed as required in the photographic material of the present invention. Gelatin is used with advantage as hydrophilic colloid in these optional layers but other hydrophilic colloids as illustrated above may be used either independently or as admixtures with gelatin.

In obtaining a desired silver halide, a solution of a water-soluble silver salt and a solution of a water-soluble halide are reacted with each other and appropriate silver salts and halides may be selected and combined according to the silver halide composition desired.

The term "a polymeric flocculating agent" means a high-molecular weight substance that is capable of aggregating silver halide grains together with protective colloids. Normally, such polymeric flocculating agents are used in a "desalting step" in which gelatin or other protective colloids are aggregated into gel and dissolved matter such as soluble salts are removed from the reaction solution.

Various compounds may be used as polymeric flocculating agents in the present invention. Preferred polymeric flocculating agents are gelatinous compounds wherein at least 50% of the amino groups in the gelatin molecule is replaced by an acyl, carbamoyl, sulfonyl, thiocarbamoyl, alkyl and/or aryl group. Equally preferred are high-molecular weight compounds that are composed of chains A and B as represented by the following general formula (A):

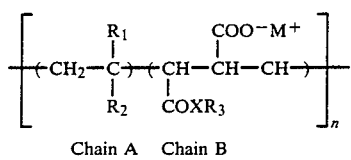

Chain A  Chain B where $R_1$ and $R_2$ which may be the same or different each represents an aliphatic group; $R_3$ represents a hydrogen atom, an aliphatic group, an aryl group or an aralkyl group; X is —O— or —NH—; $M^+$ is a cation; n is a numeral of $10-10^4$. The two linkages of chain B are such that either may be bonded to the tertiary carbon atom to which $R_1$ and $R_2$ in chain A are attached. When X is —NH—, it may form a nitrogenous ring together with $R_3$.

Illustrative substituents for the amino group in gelatin are mentioned in U.S. Pat. Nos. 2,691,582, 2,614,928 and 2,525,753. Useful substituents are listed below:
(1) acyl groups such as alkylacyl, arylacyl, acetyl, and substituted or unsubstituted benzoyl;
(2) carbamoyl groups such as alkylcarbamoyl and arylcarbamoyl;
(3) sulfonyl groups such as alkylsulfonyl and arylsulfonyl;
(4) thiocarbamoyl groups such as alkylthiocarbamoyl and arylthiocarbamoyl;
(5) straight-chained or branched alkyl groups having 1-18 carbon atoms; and
(6) aryl groups such as substituted or unsubstituted phenyl, naphthyl, and aromatic hetero rings (e.g. pyridyl and furyl).

Particularly preferred examples are those gelatins which are modified with the acyl group (—COR¹) or the carbamoyl group $$-CONH^1$$
$$\ \ \ \ |$$
$$\ \ \ \ R^2$$

where $R^1$ is a substituted or unsubstituted aliphatic group (e.g. an alkyl group of 1-18 carbon atoms or an allyl group), an aryl group or an aralkyl group (e.g. phenetyl), and $R^2$ is a hydrogen atom, an aliphatic group, an aryl group or an aralkyl group. A particularly preferred case is where $R^1$ is an aryl group or $R^2$ is a hydrogen atom.

Specific but non-limiting examples of gelatinous compounds that may be used as polymeric flocculating agents in the present invention are listed below in terms of the substituent for amino group.

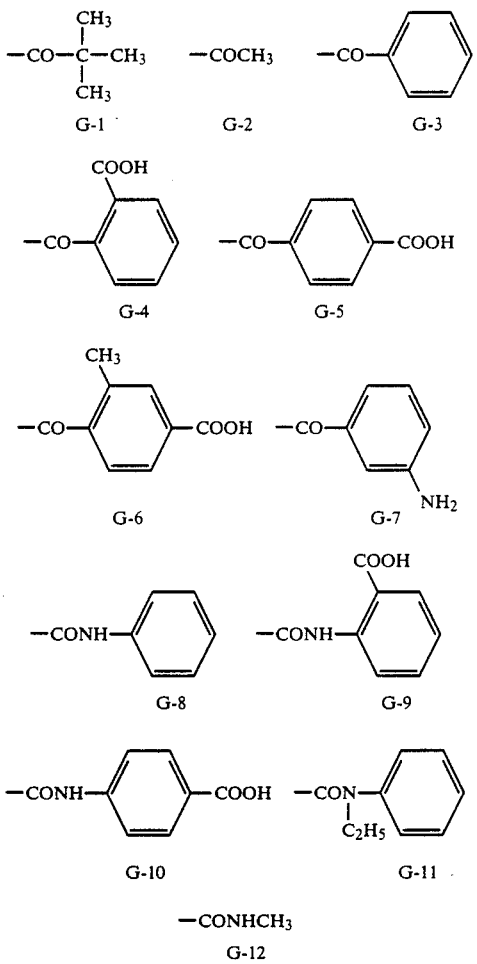

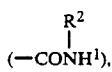
G-12

There is no particular limitation on the amount of the gelatinous flocculating agent which is to be used in the desalting step (i.e., removal of dissolved matter), but an appropriate range is from 0.3 to 10 times the weight of the substance (preferably gelatin) which is contained as protective colloid at the time of removal, with the range of 1-5 times the weight of said substance being particularly preferred.

When a gelatinous flocculating agent is used, its addition may be followed by pH adjustment to cause coagulation of the silver halide emulsion. Coagulation is preferably effected at a pH of 5.5 and below, more preferably in the range of 4.5-2. There is no particular limitation on the acids that may be used for pH adjustment and preferred examples include organic acids such as acetic acid, citric acid and salicylic acid, and inorganic acids such as hydrochloric acid, nitric acid, sulfuric acid and phosphoric acid. Heavy metal ions such as magnesium, cadmium, lead and zirconium ions may be used in combination with the gelatinous flocculating agent.

The desalting step (removal of dissolved matter) may be effected either once or more than once. In the latter case, the gelatinous flocculating agent may be added for each time of removal but it may be added only once at the initial stage.

A high-molecular weight compound of the general formula (A) may be used as a polymeric flocculating agent. The molecular weight of this compound (A) ranges preferably from $1 \times 10^3$ to $1 \times 10^6$, more preferably from $3\times 10^3$ to $2\times 10^5$. The compound is added in such an amount that the weight ratio to the protective colloid (preferably gelatin) in the emulsion ranges preferably from 1/50 to ¼, more preferably from 1/40 to 1/10.

The following are specific but non-limiting examples of the high-molecular weight compound represented by formula (A).

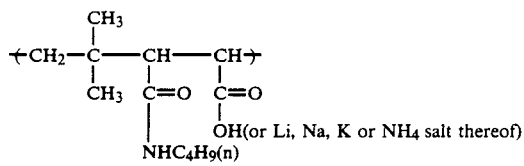
P-1

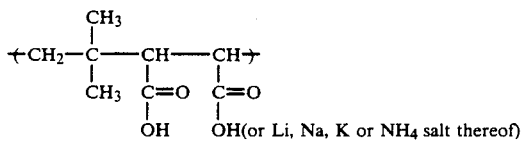
P-2

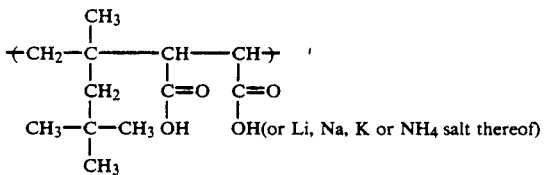
P-3

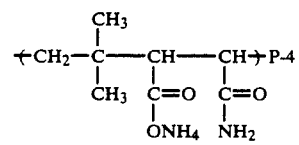
P-4

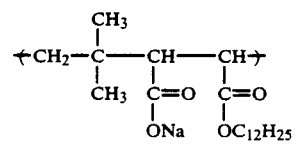
P-5

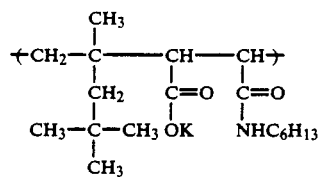
P-6

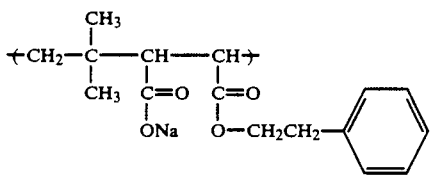
P-7

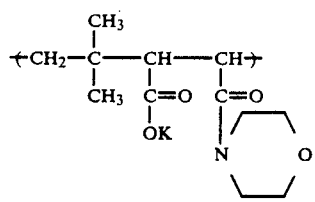
P-8

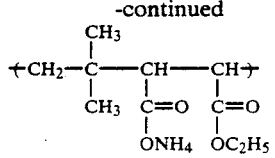
P-9

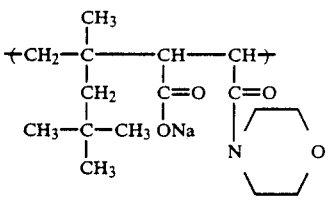
P-10

The temperature of a silver halide emulsion to which the polymeric flocculating agent is being added is preferably at 30° C. and above. A particularly preferred temperature range is from 30° to 60° C.

The pH of the reaction vessel is preferably adjusted to 2 and above during the addition of the polymeric flocculating agent, with the range of from 2 to 6 being more preferred. The pAg of the reaction vessel is preferably adjusted to 5 and above, with the range of 10–12 being more preferred.

The concentration of silver halide emulsion to which the polymeric flocculating agent being added is preferably adjusted to the range of 20% and above, with the range of 20–50% being particularly preferred. The term "the concentration of silver halide emulsion" means the weight percentage of the reaction solution taken by the silver halide emulsion.

The emulsion of the present invention may be prepared with or without seeds. In the former case, an emulsion containing seeds is first prepared and grains are grown from the seeds. If the emulsion containing seeds is itself the emulsion of the present invention prepared by using the polymeric flocculating agent, all of the emulsions that are to be obtained from this emulsion are included within the scope of the "emulsion of the present invention". It should, however, be noted that the seed emulsion used to obtain the emulsion of the present invention does not necessarily have to be the emulsion of the present invention. In a preferred embodiment, a seed emulsion that is included within the scope of the "emulsion of the present invention" is used as a seed, and another emulsion that is included within the scope of the "emulsion of the present invention" and which is prepared by using the polymeric flocculating agent of the present invention is also used in the growth of seed crystals.

Compounds represented by the general formulas (2), (3) and (4) may also be used in the present invention, and such compounds are hereinafter called "compounds of the general formula (2)" as this is considered to be appropriate.

Typical specific examples of the compounds of the general formula (2) that may be used in the present invention include, but are not limited to, the compounds listed under 1, 2, 5–16, and 31–42 as specific examples of the compounds of the general formula (1).

For the method of synthesizing the compounds of the general formula (2), the amount in which they are used, the method of their addition and the timing of their addition, see the relevant explanation given to the compounds of the general formula (1).

In the present invention, compounds of the general formulas (3) and (4) may be used together with the compounds of the general formula (2).

More preferred examples of the compound of formula (3) are those which are represented by the following general formulas (3-1) and (3-2):

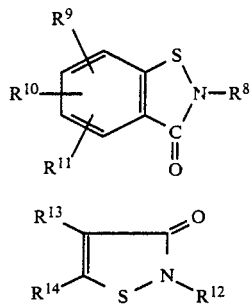

where $R^8$ is a hydrogen atom, an alkyl group or an alkoxy group; $R^9$, $R^{10}$ and $R^{11}$ each represents a hydrogen atom, a halogen atom, an alkyl group, an alkoxy group, a cyano group or a nitro group; $R^{12}$ represents a hydrogen atom, an alkyl group, a cyclic alkyl group, an alkenyl group, an aralkyl group, an aryl group, —CONHR$^{15}$ (where $R^{15}$ is an alkyl group, an aryl group, an alkylthio group, an arylthio group, an alkylsulfonyl group or an arylsulfonyl group) or a heterocyclic group; $R^{13}$ and $R^{14}$ each represents a hydrogen atom, a halogen atom, an alkyl group, a cyclic alkyl group, an aryl group, a heterocyclic group, a cyano group, an alkylthio group, an arylthio group, an alkylsulfoxide group, an alkylsulfinyl group, an alkylsulfonyl group or a heterocyclic group; provided that the alkyl group represented by $R^8$, $R^9$, $R^{10}$ or $R^{11}$ or the alkyl portion of the alkoxy group represented by these symbols is preferably a straight-chained or branched alkyl group having 1-6 carbon atoms.

Typical specific examples of the compound represented by formula (3-1) are listed below but it should be understood that the present invention is by no means limited to these examples.

Illustrative compounds 1,2-Benzoisothiazolin-3-one;
2-Methyl-1,2-benzoisothiazolin-3-one;
2-Ethyl-1,2-benzoisothiazolin-3-one;
2-(n-Propyl)-1,2-benzoisothiazolin-3-one;
2-(n-Butyl)-1,2-benzoisothiazolin-3-one;
2-(sec-Butyl)-1,2-benzoisothiazolin-3-one;
2-(t-Butyl)-1,2-benzoisothiazolin-3-one;
2-Methoxy-1,2-benzoisothiazolin-3-one;
2-Ethoxy-1,2-benzoisothiazolin-3-one;
2-(n-Propyloxy)-1,2-benzoisothiazolin-3-one;
2-(n-Butyloxy)-1,2-benzoisothiazolin-3-one;
5-Chloro-1,2-benzoisothiazolin-3-one;
5-Methyl-1,2-benzoisothiazolin-3-one;
6-Ethoxy-1,2-benzoisothiazolin-3-one;
6-Cyano-1,2-benzoisothiazolin-3-one; and
5-Nitro-1,2-benzoisothiazolin-3-one.

In the general formula (3-2), the alkyl or alkenyl group as represented by $R^{12}$ has preferably 1-36 carbon atoms, more preferably 1-18 carbon atoms. The cyclic alkyl group represented by $R^{12}$ has preferably 3-12 carbon atoms, more preferably 3-6 carbon atoms. Each of the alkyl, cyclic alkyl group, alkenyl group, aralkyl group, aryl group and heterocyclic group which are represented by $R^{12}$, as well as each of the groups represented by $R^{15}$ may have a substituent selected from among a halogen atom, nitro, cyano, thiocyano, aryl, alkoxy, aryloxy, carboxy sulfoxy, alkylcarbonyl, arylcarbonyl, alkoxycarbonyl, aryloxycarbonyl, sulfo, acyloxy, sulfamoyl, carbamoyl, acylamino, diacylamino, ureido, thioureido, urethane, thiourethane, sulfonamido, heterocyclic group, arylsulfonyloxy, alkylsulfonyloxy, arylsulfonyl, alkylsulfonyl, arylthio, alkylthio, alkylsulfinyl, arylsulfinyl, alkylamino, dialkylamino, anilino, N-alkylanilino, N-arylanilino, N-acylamino, hydroxy, mercapto, etc.

In the general formula (3-2), the alkyl group as represented by $R^{13}$ and $R^{14}$ has preferably 1-18 carbon atoms, more preferably 1-9 carbon atoms. The cyclic alkyl group as represented by $R^{13}$ and $R^{14}$ has preferably 3-18 carbon atoms, more preferably 3-6 carbon atoms. Each of the groups represented by $R^{13}$ and $R^{14}$ may have a substituent such as a halogen atom, nitro, sulfone, aryl, hydroxy, etc.

Typical specific examples of the compound represented by formula (3-2) are listed below but it should be understood that the present invention is by no means limited to these examples.

Illustrative compounds 2-(N-Methylcarbamoyl)-3-isothiazoline;
5-Methyl-2-(N-methylcarbamoyl)-3-isothiazoline;
2-(N-methylthiocarbamoyl)-3-isothiazoline;
4-Bromo-5-methyl-2-(N-methylcarbamoyl)-3-isothiazoline;
4-Cyano-5-methylthio-2-(N-methylcarbamoyl)-3-isothiazoline;
4-Cyano-5-methylsulfinyl-2-(N-methylcarbamoyl)-3-isothiazoline ;
4-Cyano-5-methylsulfonyl-2-(N-methylcarbamoyl)-3-isothiazoline;
2-(N-n-Butylcarbamoyl)-3-isothiazoline;
2-(N-t-Octylcarbamoyl)-3-isothiazoline;
5-Methyl-2-(N-phenylcarbamoyl)-3-isothiazoline;
4-Cyano-5-methylthio-2-(N-phenylcarbamoyl)-3-isothiazoline;
4-Bromo-5-methyl-2-(N-3-chlorophenylcarbamoyl)-3-isothiazoline;
5-Bromomethyl-2-(N-3-chlorophenylcarbamoyl)-3-isothiazoline;
5-Methyl-2-(N-3-chlorophenylcarbamoyl)-3-isothiazoline;
4-Cyano-5-methylthio-2-(N-3-chlorophenylcarbamoyl)-3-isothiazoline;
2-(N-3-chlorophenylcarbamoyl)-3-isothiazoline;
5-Methyl-2-(N-2-chlorophenylcarbamoyl)-3-isothiazoline;
5-Bromomethyl-2-(N-2-chlorophenylcarbamoyl)-3-isothiazoline;
4-Bromo-5-methyl-2-(N-3,4-dichlorophenylcarbamoyl)-3-isothiazoline;
5-Methyl-2-(N-3,4-dichlorodiphenylcarbamoyl)-3-isothiazoline;
4-Cyano-5-methylthio-2-(N-3,4-dichlorophenylcarbamoyl)-3-isothiazoline;
5-Methyl-2-(N-4-tosylcarbamoyl)-3-isothiazoline;
4-Cyano-5-methylthio-2-(N-4-tosylcarbamoyl)-3-isothiazoline;
4-Bromo-5-methyl-2-(N-4-tosylcarbamoyl)-3-isothiazoline;
2-(N-n-Propylcarbamoyl)-3-isothiazoline;
2-(N-Ethylcarbamoyl)-3-isothiazoline;

2-(N-i-Propylcarbamoyl)-3-isothiazoline;
4-Bromo-2-(N-methylcarbamoyl)-3-isothiazoline;
2-(N-4-Methoxyphenylcarbamoyl)-3-isothiazoline;
2-(N-2-Methoxyphenylcarbamoyl)-3-isothiazoline;
2-(N-3-Nitrophenylcarbamoyl)-3-isothiazoline;
2-(N-3,4-Dichlorophenylcarbamoyl)-3-isothiazoline;
2-(N-n-Dodecylcarbamoyl)-3-isothiazoline;
2-(N-2,5-Dichlorophenylcarbamoyl)-3-isothiazoline;
2-(N-Carboethoxymethylcarbamoyl)-3-isothiazoline;
2-(N-4-Nitrophenylcarbamoyl)-3-isothiazoline;
5-Methyl-2-(N-ethylcarbamoyl)-3-isothiazoline;
5-Methyl-2-(N-ethylthiocarbamoyl)-s-isothiazoline;
5-chloro-2-(N-ethylcarbamoyl)-3-isothiazoline;
2-n-Propyl-3-isothiazoline;
2-t-Butyl-3-isothiazoline;
2-n-Butyl-3-isothiazoline;
2-Cyclohexyl-3-isothiazoline;
2-n-Octyl-3-isothiazoline;
2-t-Octyl-3-isothiazoline;
2-Benzyloxy-3-isothiazoline;
3-Chloro-2-methyl-3-isothiazoline;
3-Chloro-2-benzyl-3-isothiazoline;
4,5-Dichloro-2-methyl-3-isothiazoline;
2,4-Dimethyl-3-isothiazoline;
4-Methyl-2-(3,4-dichlorophenyl)-3-isothiazoline;
2-(3,4-Dichlorophenyl)-3-isothiazoline;
4,5-Dichloro-2-benzyl-3-isothiazoline;
4-Bromo-5-chloro-2-methyl-3-isothiazoline;
4-Bromo-2-methyl-3-isothiazoline;
2-Hydroxymethyl-3-isothiazoline;
2-(β-Diethylaminoethyl)-3-isothiazoline;
2-n-Propyl-3-isothiazoline hydrochloride;
5-Chloro-2-methyl-3-isothiazoline hydrochloride;
2-Ethyl-3-isothiazoline hydrochloride;
2-Methyl-3-isothiazoline hydrochloride;
2-Benzyl-3-isothiazoline hydrochloride;
2-n-Dodecyl-3-isothiazoline;
2-n-Tetradecyl-3-isothiazoline;
2-(4-Chlorobenzyl)-3-isothiazoline;
2-(2-Chlorobenzyl)-3-isothiazoline;
2-(2,4-Dichlorobenzyl)-3-isothiazoline;
2-(3,4-Dichlorobenzyl)-3-isothiazoline;
2-(4-Methoxybenzyl)-3-isothiazoline;
2-(4-Methylbenzyl)-3-isothiazoline;
2-(2-Ethoxyhexyl)-3-isothiazoline;
2-(2-Phenylethyl)-3-isothiazoline;
2-(2-Phenylethyl)-4-chloro-3-isothiazoline;
2-(1-Phenylethyl)-3-isothiazoline;
2-n-Decyl-3-isothiazoline;
2-n-Octyl-3-isothiazoline;
2-t-Octyl-4-chloro-3-isothiazoline;
2-t-Octyl-4-Bromo-3-isothiazoline;
2-n-Nonyl-3-isothiazoline;
2-n-Octyl-5-chloro-3-isothiazoline;
2-(4-Nitrophenyl)-3-isothiazoline;
2-(4-carboethoxyphenyl)-3-isothiazoline;
5-Chloro-2-methyl-3-isothiazoline monochloroacetate;
4,5-Dichloro-2-methyl-3-isothiazoline monochloroacetate;
2-Ethyl-3-isothiazoline monochloroacetate;
2-n-Propyl-3-isothiazoline monochloroacetate; and
2-Benzyl-3-isothiazoline monochloroacetate.

The 1,2-benzoisothiazolin-3-one compounds represented by the general formula (3-1) are preferably incorporated in amounts ranging from $1 \times 10^{-5}$ to 10 wt % of the hydrophilic colloid used, with the range of $1 \times 10^{-4}$ to 1 wt % being particularly preferred. The isothiazolin-3-one compounds represented by the general formula (3-2) are preferably incorporated in amounts ranging from $1 \times 10^{-4}$ to 10 wt % of the hydrophilic colloid used, with the range of $3 \times 10^{-4}$ to 1 wt % being particularly preferred. The amounts in which these compounds are added depend on various factors such as the type of photographic material used, the layer in which they are incorporated and the method of coating, and the compounds may be added in amounts outside the ranges set forth above. The timing at which these compounds are added is not limited in any particular way but they are preferably added in the period from the completion of chemical ripening to coating operations.

The compounds described above may be incorporated in a photographic material by various ways. For instance, they may be dissolved in water or those organic solvents which will cause no adverse effects on photographic performance and the resulting solution may be incorporated in a hydrophilic colloid. Alternatively, the compounds in solution may be coated onto a protective layer. If desired, the photographic material may be dipped in the solution of the compounds. According to another method, the compounds are dissolved in a high-boiling point organic solvent, or a low-boiling point organic solvent or a mixture of the two types of solvent and, thereafter, the compounds are emulsified and dispersed in the presence of a surfactant, with the resulting dispersion being either added to a solution containing hydrophilic colloid or coated onto a protective layer. In still another useful method, the compounds are incorporated in a high-molecular weight compound such as poly(butyl acrylate) and dispersed in the presence of a surfactant, followed by either addition of the dispersion to a solution containing a hydrophilic colloid or coating said dispersion onto a protective layer.

Particularly preferred examples of the compounds represented by the general formula (3-1) are listed below:

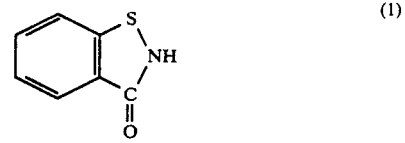
(1)

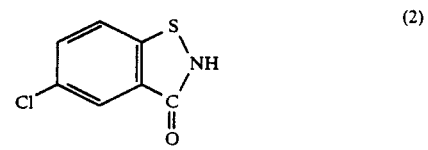
(2)

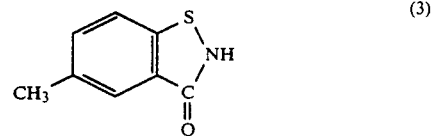
(3)

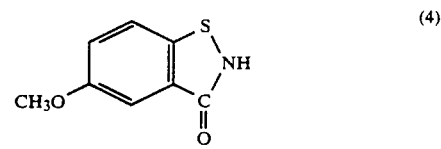
(4)

-continued

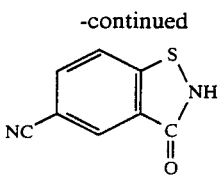 (5)

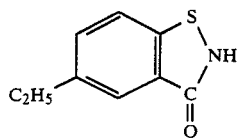 (6)

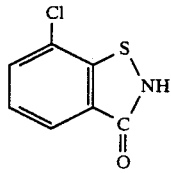 (7)

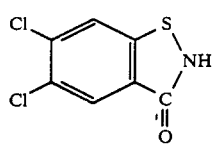 (8)

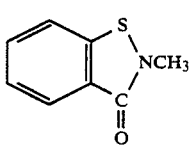 (9)

Particularly preferred examples of the compound represented by the general formula (3-2) are listed below.

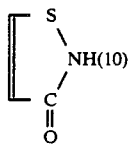 (10)

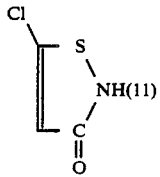 (11)

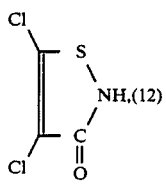 (12)

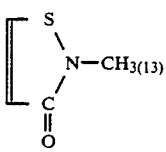 (13)

-continued

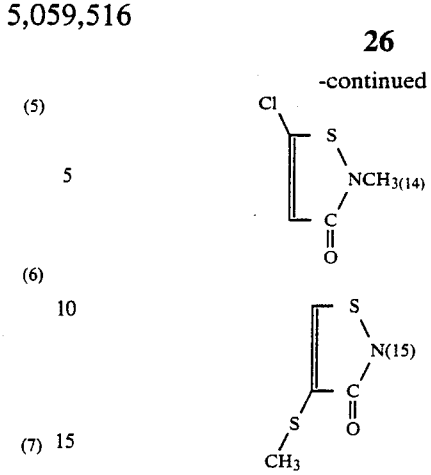

Specific but non-limiting examples of the compound represented by the general formula (4) are listed below.

$$HOCH_2-\underset{\underset{NO_2}{|}}{\overset{\overset{Br}{|}}{C}}-CH_2OH \quad (16)$$

$$HOCH_2-\underset{\underset{NO_2}{|}}{\overset{\overset{Br}{|}}{C}}-\underset{\underset{CH_3}{|}}{CHOH} \quad (17)$$

$$HOCH_2-\underset{\underset{NO_2}{|}}{\overset{\overset{Br}{|}}{C}}-CH_3 \quad (18)$$

$$H-\underset{\underset{NO_2}{|}}{\overset{\overset{Br}{|}}{C}}-\underset{\underset{CH_3}{|}}{CH-OH} \quad (19)$$

The compound listed above, part of which are commercially available, can be synthesized with reference to known publications.

The amount in which the compound of general formula (4) is added is not limited to any particular value but it is preferably used in an amount ranging from $1 \times 10^{-5}$ to 10 wt % of hydrophilic colloid, with the range of $1 \times 10^{-4}$ to 1 wt % being more preferred. A particularly preferred range is from $3 \times 10^{-4}$ to 1 wt %.

The timing of addition of the compound (4) also is not limited in any particular way but it is preferably added in the period from the completion of chemical ripening to coating operations.

The compounds of formulas (3) or (4) may be used either on their own or as admixtures. If desired, compounds of both type may be used in combination.

The present invention is adapted for rapid access processing and one preferred embodiment is using an automatic processor whose total operating time ranges from 20 second or more but less than 60 seconds. The photographic material of the present invention will not experience any deterioration in photographic performance, in particular, graininess even if it is subjected to such rapid access processing.

The term "the total processing time" as used herein means the total time required for the leading edge of a film fed into the automatic processor to pass through a developing tank, a first crossover zone, a fixing tank, a second crossover zone, a washing tank, a third crossover zone and a drying zone and to emerge from the last-mentioned drying zone [in other words, this term means the quotient (sec) obtained by dividing the overall length (m) of the processing line by the line transport speed (m/sec)]. The time associated with the crossovers is included for a reason that is well known in the art: even in the crossover zones, the gelatin film swells with the processing solution carried over from the previous step, so photographic processing is considered to proceed effectively in the crossover zones.

There is no particular limitation on the type of an automatic processor whose total processing time is within the range of 20 second or more but less than 60 seconds and which is preferably used in the practice of the present invention, and either a roller-transport or belt-transport type may be used, with the roller-transport type being preferred.

Figure 2:
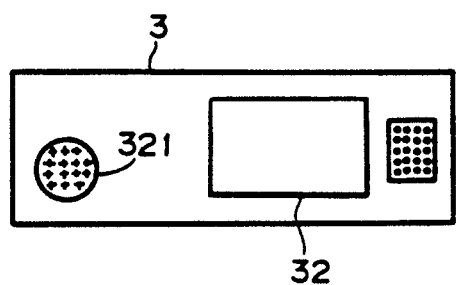
FIG. 2 is a front view of the operating panel on the processor shown in FIG. 1.

An example of the automatic processing apparatus that is preferably used in the practice of the present invention is shown in FIG. 1. The front view of the operating panel on the processor is shown in FIG. 2. In FIG. 1, the numeral 1 indicates a film insertion tray; 1a is a film inlet; 2a is a film outlet; 1' is an exit route; 2 is a film basket; 20 is a housing; 22 is a cock; 3 is the operating panel; 31 is a receiver for remote control; 4 is a roller; 5 is a transport pathway; 6 is a developer tank; 7 is a fixing tank; 8 is a washing tank; 9 is a drying zone; 91 is a squeeze zone (squeeze rack); and 92 is drying means (drying rack). In FIG. 2, a display and a speaker are indicated by 32 and 321, respectively.

The next topic to be discussed covers silver halide grains that can be used in the practice of the present invention and additives that may be incorporated in emulsion layers and other photographic constituent layers.

Silver halide grains that can be used in the practice of the present invention may be prepared by various techniques such as the neutral process, acid process, ammoniacal process, normal precipitation method, reverse precipitation method, double-jet method, controlled double-jet method, conversion process and core/shell process, all being described in known publications such as T. H. James ed. "The Theory of the Photographic Process", 4th ed., Macmillan, 1977, pp. 38–104. Any silver halide compositions may be used, such as silver chloride, silver bromide, silver chlorobromide, silver iodobromide, silver chloroiodide, silver chloroiodobromide and mixtures thereof. A preferred emulsion is a silver iodobromide emulsion containing no more than ca. 10 mol % of AgI. More preferably, the AgI content is not more than 6 mol % and most preferably, the AgI content is in the range of 0.2–6 mol %. For the purpose of improving flash exposure characteristics, an iridium salt and/or a rhodium salt may be incorporated in these silver halide grains or silver halide emulsions.

In the practice of the present invention, it is preferred that at least 40% by weight or number of the silver halide grains present in a silver halide emulsion layer is composed of substantially cubic or tetrahedral grains with the crystal surfaces having round apexes. The term "substantially" does not exclude the case where other crystallographic forms are present to an extent that will not be detrimental to the effects as achieved by cubic or tetrahedral grains.

The roundness of the apexes on the surfaces of crystal grains is arbitrary, including the case where they are slightly rounded.

The apexes on the surfaces of silver halide grains may be rounded by methods commonly known in the art, which involve the use of various compounds, such as organic thioethers (see U.S. Pat. Nos. 3,271,157, 3,531,289, 3,574,628, JP-A-54-1019, 54-158917, etc.), thiourea derivatives (see JP-A-53-82408, 55-77737, 55-2982, etc.), a silver halide solvent having a thiocarbonyl group interposed between an oxygen or sulfur atom and a nitrogen atom (see JP-A-53-144319), imidazoles, sulfites or thiocyanates (see JP-A-54-100717, etc.), and silver halide solvents such as potassium halide (see JP-A-59-178447).

Tabular grains can be used in the practice of the present invention and can be prepared by adding a certain chemical such as a thioether during grain growth. For tabular grains, see prior patents such as JP-A-58-113927, 58-113928, 59-105636 (pp. 252–253), and 60-147727.

Silver halide grains may be used either on their own or as admixtures. The size of silver halide grains used is not limited to any particular value but the preferred rage is from 0.05 to 2 $\mu$m, with the range of 0.1–2.0 $\mu$m being more preferred. A particularly preferred range is from 0.15 to 1.5 $\mu$m.

Silver halide grains preferably contain at least 80% of grains that are in the range of 0.2–0.7 $\mu$m in size.

The term "grain size" as used herein means the diameter of a silver halide grain if it is spherical and the average of diameters of equivalent circles for the projected image of silver halides grain if they are non-spherical.

The size distribution of silver halide grains to be used in the practice of the present invention may be mono- or polydispersed, with the former case being preferred. A "monodispersed" system is such that at least 95% of the grains present are within ±40% of the number average grain size, or the number average diameter of the projected area of grains.

The silver halide grains to be used may have any internal structure but a core/shell structure having different silver halide compositions in the core and shell portions is preferred. Several examples of a core/shell structure are described in JP-B-58-1415, 46-19024, 49-21657, JP-A-58-95736, 58-126526, 58-127920, 59-52237, 58-181037, 59-177535, 59-178447, etc.

Particularly preferred grains are those having at least one set of adjacent layers in such a structure that the inward layer has the higher content of silver iodide, preferably by excess of at least 20 mol %.

Also preferred are silver halide grains having a localized portion in which silver iodide is localized at a concentration of at least 20 mol %. Such a highly localized portion of silver iodide is preferably present in an area that is as inward as possible or as remote as possible from the outer surface of the grain. It is particularly preferred that the localized portion is present in an area that is at least 0.01 $\mu$m remote from the outer surface of the grain.

The localized portion may form layers in the interior of the grain. Alternatively, it may assume the core of a core/shell structure, in which case part or all of the grain core except the shell portion which is at least 0.01 $\mu$m thick beneath the outer surface of the grain is preferably a localized portion having a silver iodide concentration of at least 20 mol %.

It is more preferred that the localized portion has a silver iodide concentration of 30–40 mol %.

Preferably, seeds are used in forming grains having a highly localized ($\geq 20$ mol %) AgI portion in their interior (preferably in an inward area that is at least 0.01 μm remote from the wall of grain). Desired grains may be formed without using seeds. In the latter case, the phase of a reaction solution (hereinafter referred to as the "mother liquor") containing protective gelatin does not contain any silver halide that may serve as growth nucleus before the start of ripening. Thus, silver ions and halide ions that contain iodide ions at a high concentration of at least 20 mol % are first supplied to form growth nuclei. By continued supply of both ions, grains are allowed to form from the growth nuclei.

Subsequently, the grains are coated with a silver halide such as silver iodobromide, silver chloroiodobromide, silver chlorobromide, silver bromide or silver chloride. Preferably, the shell portion which is at least 0.01 μm thick, more preferably 0.01–0.5 μm thick, beneath the outer surface is comprised of silver iodobromide containing no more than 10 mol % AgI, with the AgI content of no higher than 5 mol % being particularly preferred. Most preferably, the shell portion is comprised of a AgI-free silver halide (normally, silver bromide).

When seeds are to be used, silver iodobromide containing at least 20 mol % of AgI is formed in seed crystals alone, which are then coated with a shell layer. Alternatively, the AgI content of seeds is adjusted to be either 0% or a value not exceeding 10 mol %, and as the seeds are allowed to grow, silver iodobromide containing at least 20 mol % AgI is formed within the grains, which are thereafter coated with a shell layer.

As will be described below, silver halide grains of a multi-layered structure are preferred for the present invention since they permit easy preparation of monodispersed emulsions.

The silver halide composition for the internal nucleus and the coating layer may be a mixture with a small amount of silver chloride (preferably with the AgCl content of not exceeding ca. 10 mol %, more preferably not exceeding ca. 5 mol %).

Another method that may be adopted to form a layer of localized portion is halogen substitution. This may be accomplished by first forming internal nuclei, then adding an aqueous solution of iodine compound. For further details of halogen substitution, see U.S. Pat. Nos. 2,592,250, 4,075,020 and JP-A-55-127549.

As already mentioned, monodispersed emulsions are preferably used in the practice of the present invention. By using monodispersed emulsions, chemical sensitization and other sensitizing treatments can be fully accomplished to provide an extremely high sensitivity and yet satisfactorily contrasty photographic materials can be obtained with minimum occurrence of low contrast due to sensitizing treatments.

The preparation of a monodispersed emulsion starts with the growth of crystal grains. For grain growth, silver and halide ions may be added alternately on a time basis but more preferably, they may be added by the "double-jet method".

Silver and halide ions are preferably added at a limited growth rate at which no existing crystal grains will dissolve away as grains grow, or at which silver halide is supplied in an amount that is necessary and sufficient to ensure the growth of only existing grains without permitting new grains to form and grow. Alternatively, the growth rate of crystal grains may be increased continuously or in steps within the permissible range of the limited growth rate. For methods that may be employed to increase the growth rate continuously or in steps, see JP-B-48-36890, 52-16364 and JP-A-55-142329. The limited growth rate will vary with various factors including temperature, pH, pAg, the degree of agitation, the composition of silver halide grains, their solubility, grain size, intergrain distance, crystal habit, as well as the type and concentration of protective colloid, but it may be readily determined on a trial-and-error basis by such methods as microscopic examination of emulsion particles suspended in the liquid phase, turbidity measurement, etc.

A particularly preferred method for preparing the monodispersed emulsion described above is that with seeds being used as growth nuclei, silver and halide ions are supplied to have crystal grains grow until the desired emulsion is formed. The broader the size distribution of the seed crystals, the broader the size distribution of the grown crystals. Hence, in order to obtain a monodispersed emulsion, it is preferred to use seed grains having a narrow size distribution.

In a particularly preferred method of preparing silver halide grains suitable for use in the present invention, the double-jet method described above is employed, and after forming a layer of high AgI content ($\geq 20$ mol %) at pAg of $7.3\pm0.2$, a shell layer is formed at pAg of $9.0\pm0.2$, with pAg being adjusted at 9.7 and above in the second half of the period of grain preparation, namely the period corresponding to the formation of the shell layer. This may be done by increasing the pAg either slowly or momentarily when one half the amount of silver necessary to prepare silver halide grains has been supplied, so that the pAg will be at 9.7 and above when the mixing of silver and halide ions has been completed.

In a more preferred way, when two thirds to nine tenth of the amount of silver necessary to prepare silver halide grains have been supplied, the pAg is increased from $9.0\pm0.2$ either slowly or momentarily, so that the pAg will be at 9.7 and above. Most preferably, the pAg is at 10.1 and above when the mixing of silver and halide ions has been completed.

Silver halide emulsions are normally subjected to chemical sensitization at the surfaces of silver halide grains and this technique may also be adopted in the present invention. For chemical sensitization, the methods described in H. Frieser ed., "Die Grundlagen der Photographischen Prozessemit Silberhalogeniden, Akademische Verlagsgesellschaft", 1968, pp. 675–734 may be adopted and they include ordinary sulfur sensitization, reduction sensitization, noble metal sensitization and combinations of these techniques. Specific chemical sensitizers include: sulfur sensitizers such as allyl thiocarbamide, thiourea, thiosulfate, thioether and cystine; noble metal sensitizers such as potassium chloroaurate, aurous thiosulfate and potassium chloropalladate; and reduction sensitizers such as tin chloride, phenylhydrazine and reductone.

Light-sensitive emulsions may be used either on their own or as admixtures in the present invention.

After completion of the chemical sensitization described above, various stabilizers such as 4-hydroxy-6-methyl-1,3,3a,7-tetrazaindene, 5-mercapto-1-phenyltetrazole and 2-mercaptobenzothiazole may be added in the practice of the present invention.

The photographic material of the present invention may be constructed in various ways. For instance, a silver halide emulsion layer may be formed on either one or both sides of a base support. If desired, an auxiliary layer such as a protective layer or an antihalation layer may be disposed at an appropriate position. If an emulsion layer is formed on only one side of a base support, a layer made of a hydrophilic colloid such as gelatin may be formed as a backing layer on the other side of the base support. For such purposes as facilitating identification of front or back side, various dyes may be incorporated in the backing layer, and particularly effective dyes are those represented by the following general formula (B):

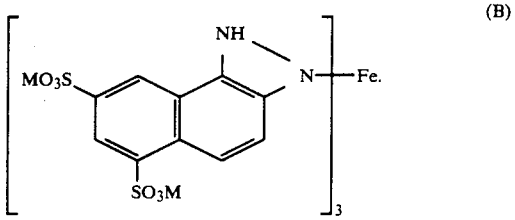

where M is an alkali metal ion or an ammonium ion.

A particularly preferred layer arrangement to be adopted by the photographic material of the present invention is such that a silver halide emulsion layer is formed on only one side of a base support, with the other side being coated with a backing layer containing an appropriate dye.

In the practice of the present invention, light-sensitive silver halide and other additives are usually incorporated in photographic constituent layers by being dispersed in suitable binders. Various hydrophilic colloids may be used as binders but a preferred binder is typically gelatin. With a view to improving the physical properties of coated films that use hydrophilic colloids as binders, various agents for improving physical properties, such as hardeners, are preferably used depending on the need.

Useful hardeners include: aldehyde compounds; aziridine compounds (see, for example, PB Report 19,921, U.S. Pat. Nos. 2,950,197, 2,964,404, 2,983,611, 3,271,175, JP-B-46-40898, and JP-A-50-91315); isoxazole compounds (see, for example, U.S. Pat. No. 331,609); epoxy compounds (see, for example, U.S. Pat. Nos. 3,047,394, German Patent No. 1,085,663, UK Patent No. 1,033,518, and JP-B-48-35495); vinylsulfone compounds (see, for example, PB Report 19,920, German Patent No. 1,100,942, UK Patent No. 1,251,091, Japanese Patent Application Nos. 45-54236, 48-110996, U.S. Pat. Nos. 353,964 and 3,490,911); acryloyl compounds (see, for example, Japanese Patent Application No. 48-27949 and U.S. Pat. No. 3,640,720); carbodiimide compounds (see, for example, U.S. Patent No. 2,938,892, JP-B-46-38715, and Japanese Patent Application No. 49-15095) as well as maleimide compounds, acetylene compounds, methanesulfonate esters, triazine compounds, and polymer type hardeners.

Other additives that may be used include: thickeners (see, for example, U.S. Pat. No. 3,167,410 and Belgian Patent No. 558,143); gelatin plasticizers (e.g. polyols as described in U.S. Pat. No. 2,960,404, JP-B-43-4939, and JP-A-48-63715); latices (see, for example, U.S. Pat. No. 766,979, French Patent No. 1,395,544, and JP-B-48-43125); and matting agents (see, for example, UK Patent No. 1,221,980).

Any desired coating aids may be incorporated in constituent layers in the silver halide photographic material of the present invention. Illustrative coating aids include: saponin and sulfosuccinate type surfactants (see, for example, UK Patent No. 548,532 and Japanese Patent Application No. 47-89630); and anionic surfactants (see, for example, JP-B-43-18166, U.S. Pat. No. 3,514,293, French Patent No. 2,025,688, and JP-B-43-10247).

Coating compositions using hydrophilic colloids as binders may contain photographic addenda other than the hardeners described above and such optional addenta include gelatin plasticizers, surfactants, uv absorbers, anti-stain agents, pH regulators, anti-oxidants, antistats, thickeners, graininess improving agents, dyes, mordants, brighteners, development rate regulators, matting agents, and silver halide developers (see the discussion that follows). These additives may be used in amounts that will not impair the effectiveness of the present invention.

Various compounds may be incorporated in photographic emulsions for the purpose of preventing desensitization or fogging that might occur during the manufacture, storage or processing of photographic materials. The compounds that may be used for this purpose are known as stabilizers in the art and include, but are not limited to, the following: azoles such as nitroindazoles, triazoles, benzotriazoles, and benzimidazoles; mercapto compounds such as heterocyclic mercapto compounds, mercaptothiazoles, mercaptobenzothiazoles, mercaptobenzimidazoles and mercaptopyridines; thioketo compounds; azaindenes; mercaptoazaindenes; benzenethiosulfonic acids; and benzenesulfinic acids.

Several of the compounds that may be used as stabilizers are described in E. K. Mees, "The Theory of the Photographic Process", 3rd ed., Macmillan, 1966, together with the references that first reported the use of such compounds.

For further details of these compounds and the use thereof, see U.S. Pat. Nos. 3,954,474, 3,982,947, 4,021,248, etc.

Antifoggants or stabilizers that may be used with particular preference include the compounds represented by the following general formulas (5), (6), (7) and (8), as well as nitroso compounds:

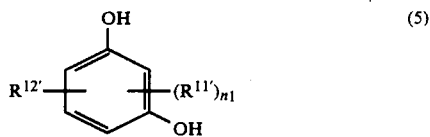

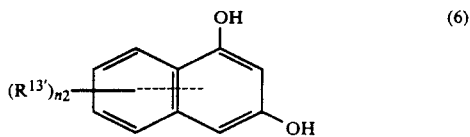

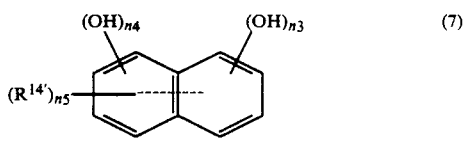

where $R^{11}$ represents a hydrogen atom, a halogen atom, a hydroxyl group, an optionally substituted alkyl group, an optionally substituted aralkyl group, an optionally substituted alkoxy group, an optionally substituted acyl group, an optionally substituted carboxymethyl group, —COOM or —SO$_3$M (where M is a hydrogen atom, an alkali metal atom or an ammonium group); $R^{12'}$, $R^{13'}$ and $R^{14'}$ each represents —COOM or —SO$^3$M; $n_1$ and $n_2$ each represents an integer of 1–3; $n_3$ is an integer of 1 or 2; $n_4$ and $n_5$ each represents 0 or 1; provided that $n_3$ and $n_4$ are not both zero and that when $n_1$ and $n_2$ are 2 or 3, $R^{11'}$ and $R^{13'}$ may be the same or different;

(8)

where Z represents the atomic group necessary to form a 5- or 6-membered hetero ring of C, N, O and S atoms together with C=N, provided that a plurality of such hetero rings may be condensed to form such rings as tetrazole, triazole, imidazole, thiadiazole, oxadiazole, oxazole, benzothiazole, benzimidazole, benzoxazole, purine, azaindene, tri-tetrapentapyridine and pyridine rings; these hetero rings may have such substituents as an alkyl group, an alkoxy group, an amino group, a nitro group, a halogen atom, a carbamoyl group, an alkylthio group and a mercapto group.

Preferred examples of the compound of formula (8) are those in which Z forms a tetrazole, triazole, thidiazole, benzimidazole or benzothiazole ring together with C=N, and the most preferred compound is such that Z forms a thiadiazole ring together with C=N. In formula (8), M represents a hydrogen atom, —NH$_4$ or an alkali metal atom.

Specific examples of the compounds of formulas (5)–(8) that are preferably used in the present invention are described on pages 65–74 of the specification of JP-A-63-60447.

Compounds represented by the following general formula (9a) may also be used with preference in the present invention:

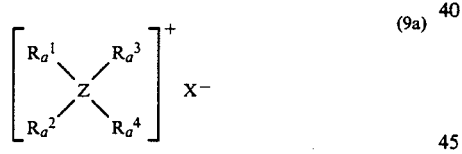
(9a)

where Z is a phosphorus or nitrogen atom; $Ra^1$, $Ra^2$, $Ra^3$ and $Ra^4$ each represents a substituted or unsubstituted alkyl, aryl or aralkyl group, provided that at least one of these is an aryl or aralkyl group having an electron withdrawing group; and X— is an acid anion.

Among the compounds of formula (9a), those which are represented by the following general formula (9b) are used with particular advantage in the present invention:

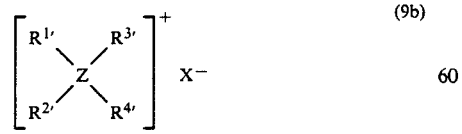
(9b)

where Z is a phosphorus or nitrogen atom; $R^{1'}$, $R^{2'}$, $R^{3'}$ and $R^{4'}$ each represents a substituted or unsubstituted alkyl group of 1–6 carbon atoms, a phenyl group, a tolyl group, a xylyl group, a biphenyl group, a naphthyl group, an anthryl group or

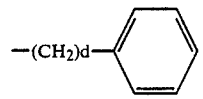

(d: integer of 1–6), with a suitable substituent being selected from among —CH$_3$, —OH, —CN, —NO$_2$, halogen atom, carbonyl group, carboxyl group, sulfonyl group, quaternary amino group, etc. and with the number of substituents being 1 or 2, provided that at least one of $R^{1'}$, $R^{2'}$, $R^{3'}$ and $R^{4'}$ is an aryl or aralkyl group having an electron withdrawing substituent such as a nitro group, a cyano group, a halogen atom, a carbonyl group, a carboxyl group, a sulfonyl group, or a quaternary amino group; X— is an acid anion such as Br—, Cl—, I—, ClO$_4$— or BF$_4$—.

The compounds of formulas (9a) and (9b) can be synthesized by the methods described in U.S. Pat. No. 3,951,661.

Specific examples of the compounds of formulas (9a) and (9b) that are preferably used in the present invention are described on pages 78–82 of the specification of JP-A-63-60447.

Various kinds of nitroso compounds may be used as anti-foggants or stabilizers. Useful examples are nitroso compounds represented by the following structural formulas (10) and (11) that are described in Journal of the Chemical Society, No. 1, pp. 824–825 (1938).

Inorganic and organic salts of these nitroso compounds are also usable and specific examples are salts of these nitroso compounds with chloric acid, bromic acid, perchloric acid, hydrosulfuric acid, acetic acid, etc.

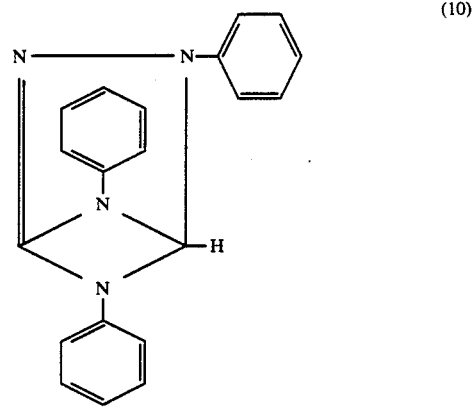
(10)

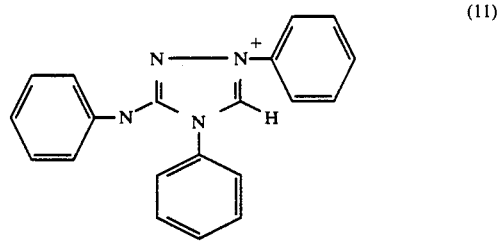
(11)

The following nitroso compounds which are described in JP-A-60-122936 and 60-117240 may also be used as anti-foggants or stabilizers:

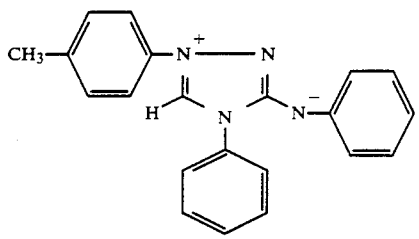

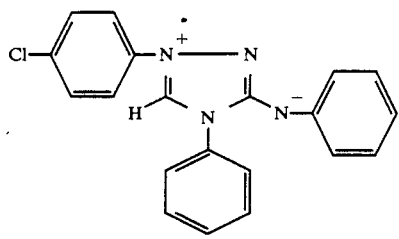

Also useful are the compounds represented by the following general formula (C):

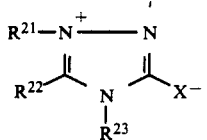

where X is a sulfur atom or =N—$R^{24}$; $R^{21}$, $R^{22}$, $R^{23}$ and $R^{24}$ each represents a hydrogen atom, or a substituted or unsubstituted alkyl, aryl or hetero ring, provided that when $R^{24}$ is a hydrogen atom, $R^{21}$-$R^{23}$ represent something else; $R^{21}$ and $R^{22}$, $R^{22}$ and $R^{23}$ and $R^{23}$ and $R^{24}$ may combine to form rings.

Specific examples of the compounds of formula (C) that are preferably used in the present invention are described on pages 88–91 of the specification of JP-A-63-60447.

It is particularly preferred that photographic emulsions to be used in the present invention also incorporate compounds of the following general formula (11) in order to prevent deteroration of image quality that might occur in rapid processing at high pH and high temperature, as well as to improve graininess of the image. As described in JP-A-58-158631, these compounds are added in amounts that range generally from 0.001 to 2 mg, preferably from 0.01 to 1 mg per gram of binder.

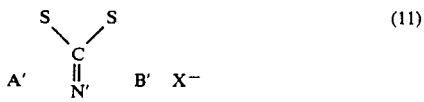

where A' and B' each represents the nonmetallic atomic group necessary to form a hetero ring together with S and N; X— is an anion such as Cl—, Br—, ClO— or $CH_3SO_3$—.

Preferred examples of the compounds of formula (11) are those in which A' and/or B' is represented by

($R^{51}$ is a hydrogen atom or a lower alkyl group; and n is 2 or 3).

Specific examples of the compounds of formula (11) that are preferably used in the practice of the present invention are described on page 131 of the specification of JP-A-63-60447.

It is preferred for the photographic material of the present invention to contain in emulsion layers or other photographic constituent layers a polyhydric alcohol that has a melting point of 40° C. and above and which has at least two hydroxyl groups in the molecule. Preferred polyhydric alcohols are those which have 2–12 hydroxyl groups in the molecule, with 2–20 carbon atoms being present, and which are incapable of assuming an oxidized form (i.e. hydroxyl groups are not conjugated with a chain). More preferably, such polyhydric alcohols have melting points in the range of 50°–300° C.

For specific examples of such polyhydric alcohols, the amount in which they are added and the method of their addition, reference may be made to pages 19–24 of the specification of Japanese Patent Application No. 62-172534.

Any kinds of base support may be used in the photographic material of the present invention and typical examples include: baryta paper, polyethylene coated paper, polypropylene synthetic paper, glass sheet, cellulose acetate, cellulose nitrate, polyester films such as a polyethylene terephthalate film, as well as polyamide, polypropylene, polycarbonate and polystyrene films. A preferred example is a polyethylene terephthalate film that is tinted to the same shade of blue as that employed in ordinary medical radiography.

The following examples are provided for the purpose of further illustrating the present invention but are in no way to be taken as limiting.

EXAMPLE 1

(i) Preparing Emulsions (A) Preparing seeds T-1 and T-2

Monodispersed cubic grains (average size, 0.15 μm) of silver iodobromide containing 2 mol % AgI were prepared by the double-jet method with the temperature, pAg and pH controlled at 60° C., 8 and 2.0, respectively. The reaction solution containing the grains was divided into two portions, which were respectively desalted by the methods described below, so as to obtain two kinds of seeds, T-1 and T-2.

Desalting for T-1:

To the reaction solution held at 40° C., the product of condensation between sodium naphthalenesulfonate and formaldehyde (compound 1) and magnesium sulfate ($MgSO_4$) were added in respective amounts of 15 g and 60 g per mole of AgX and the mixture was stirred for 3 minutes. After allowing the mixture to stand, excess salt was removed by decantation. Thereafter, pure water (40° C.) was added in an amount of 2.1 L per mole of AgX and a dispersion was formed. After adding $MgSO_4$ in an amount of 30 g per mole of AgX, the dispersion was stirred for 3 minutes, allowed to stand and subjected to decantation. Thereafter, postgelatin was added and the mixture was held at 55° C., followed by stirring for redispersion to obtain T-1.

Desalting for T-2 (i.e., means for removing dissolved matter to obtain an emulsion of the present invention):

To the reaction solution held at 60° C., 38 g of gelatinous flocculating agent G-3 (90% substituted) was added as a polymeric flocculant and the mixture was stirred for 3 minutes. Thereafter, potassium hydroxide (KOH) was added in an amount of 0.13 g per mole of AgX to adjust the pH to 4.0, followed by standing and decantation. After adding pure water (40° C.) in an amount of 2.1 L per mole of AgX, KOH was added in an amount of 0.25 g per mole of AgX to adjust the pH to 5.8, and the mixture was stirred for 5 minutes. Thereafter, 1.7N nitric acid ($HNO_3$) was added in an amount of 1.5 ml per mole of AgX to adjust the pH to 4.3, followed by standing and decantation. Thereafter, post-gelatin and KOH (0.2 g/mol AgX) were added to adjust the pH to 5.8, followed by redispersion to obtain T-2.

The resulting seed emulsion T-2 was an emulsion of the present invention, so an emulsion that would be prepared from T-2 is also included within the scope of the present invention.

(B) Growth from seeds

Using seeds T-1 and T-2, grain growth was effected in the following manner. First, a solution (corresponding to a solution containing protective colloid) that was held at 40° C. and which contained protective gelatin and optionally ammonia was provided in an amount of 8.5 L. Seed T-1 was dissolved in this solution and the pH of the mixture was adjusted with acetic acid to prepare a mother liquor. To this mother liquor, a 3.2N aqueous solution of ammoniacal silver ions was added as a solution of water-soluble silver salt by the double-jet method, with the pH and pAg being properly varied depending upon the content of AgI and crystal habit in the following way. First, pAg and pH were controlled at 7.3 and 9.7, respectively, to form a layer containing 35 mol % AgI. In the next step, the pH was changed between 9 and 8 with the pAg held at 9.0 until graine grew to 95% of the final size. Subsequently, a solution of potassium bromide was added through a nozzle as a solution of water-soluble halide over a period of 8 minutes so as to adjust the pAg to 11.0. The mixing operation was terminated 3 minutes after completion of the addition of potassium bromide. Subsequently, acetic acid was added to adjust the pH to 6.0. The resulting emulsion was comprised of monodispersed grains having an average grain size of 0.30 μm and an overall AgI content of ca. 2 mol %. The reaction solution containing this emulsion was divided into two portions, which were respectively treated by the following two methods (a) and (b) so as to remove excess soluble salts (this step corresponds to removal of dissolved matter).

Desalting method (a):

1. To the reaction solution held at 40° C., compound 1 (intended as a comparison for the polymeric flocculant of the present invention) and $MgSO_4$ were added in respective amounts of 5.5 g and 8.5 g per mole of AgX. The mixture was stirred for 3 minutes, allowed to stand and subjected to decantation.

2. Pure water (40° C.) was added in an amount of 1.8 L per mole of AgX and a dispersion was formed. Following addition of $MgSO_4$ in an amount of 20 g per mole of AgX, the mixture was stirred for 3 minutes, allowed to stand and subjected to decantation.

3. Step 2 was repeated once more.

4. Post-gelatin (15 g/mol AgX) and water were added to work up the mixture to 450 ml per mole of AgX, which was stirred at 55° C. for 20 minutes to make a dispersion.

By the sequence of steps 1-4, emulsion 1-1 was prepared.

Desalting method (b):

1. To the reaction solution held at 40° C., gelatinous flocculating agent G-3 was added as a polymeric flocculant in an amount of 50 g per mole of AgX. Thereafter, 56 wt % acetic acid (HAC) was added in an amount of 100 ml per mole of AgX to adjust the pH to 5.0, followed by standing and decantation.

2. Pure water (40° C.) was added in an amount of 1.8 L per mole of AgX. Then, KOH was added in an amount of 6.8 g per mole of AgX to adjust the pH to 6.0. After thorough dispersing, 56 wt % HAC was added in an amount of 70 ml per mole of AgX to adjust the pH to 4.5. The mixture was thereafter allowed to stand and subjected to decantation.

3. Step 2 was repeated once more.

4. Post gelatin (15 g/mol AgX), KOH (1 g/mol AgX) and water were added to work up the mxiture to 450 ml per mole of AgX.

By the sequence of steps 1-4, emulsion 1-2 was prepared.

Desalting method (b) corresponds to means for removing dissolved matter to obtain an emulsion of the present invention.

In a similar way, grains were grown from seed T-2 and desalted by two methods (a) and (b) to prepare emulsions 2-1 and 2-2.

(ii) Preparing and Evaluating Samples (ii-1) Preparing samples

The four emulsions prepared in (i) were subjected to chemical sensitization which consisted of gold-sulfur sensitization by addition of ammonium thiocyanate, chloroauric acid and hypo.

After the chemical sensitization, 4-hydroxy-6-methyl-1, 3, 3a, 7-tetrazaindene was added in an amount of 150 mg per mole of AgX. Thereafter, spectral sensitization was performed by adding the spectral sensitizing dyes shown in Table 1 to be given later in this specification.

Various additives were also added to the emulsions; they were trimethylolpropane (9 g per mole of silver halide), nitrophenyl triphenyl phosphonium chloride (30 mg), ammonium 1, 3-dihydroxybenzene-4-sulfonate (1 g), sodium 2-mercaptobenzimidazole-5-sulfonate (10 mg) and 2-mercaptobenzothiazole (10 mg). Other additives were as follows:

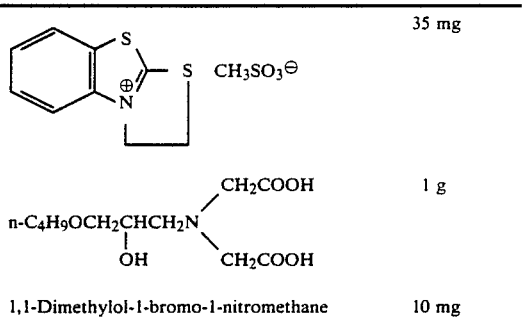

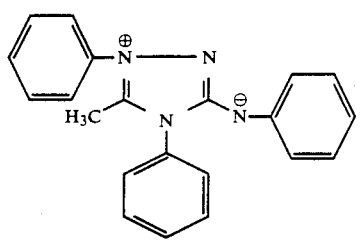

60 mg

The following compound was used as an additive for protective layer:

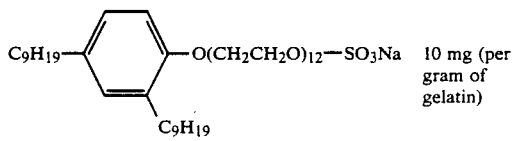

10 mg (per gram of gelatin)

(iii) Preparing coated samples

A coating solution of backing layer was prepared from gelatin (400 g), polymethyl methacrylate (2 g), sodium dodecylbenzene-sulfonate (6 g), antihalation dye I (20 g) to be identified hereinafter and glyoxal. Also prepared was a 10 wt % diluted aqueous dispersion of a terpolymer composed of glycidyl methacrylate (50 wt %), methyl acrylate (10 wt %) and butyl methacrylate (40 wt %). This dispersion was coated onto a polyethylene terephthalate base to form a subbing layer. On one side of this subbed base, the coating solution of backing layer was applied together with a coating solution of protective layer that was composed of gelatin, matting agent, sodium dodecylbenzenesulfonate and glyoxal. The coating weights of the backing layer and protective layer were 2.5 g/m$^2$ and 2.0 g/m$^2$, respectively, in terms of gelatin deposit.

Antihalation dye I

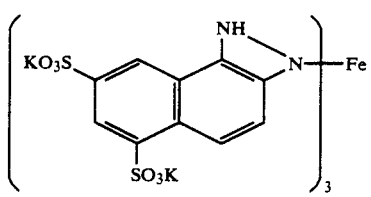

2 mg

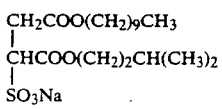

7 mg

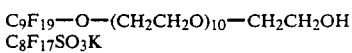

$C_9F_{19}-O-(CH_2CH_2O)_{10}-CH_2CH_2OH$ 2 mg
$C_8F_{17}SO_3K$ 3 mg

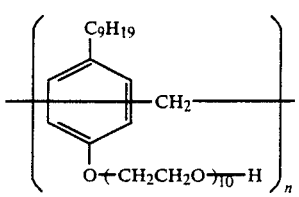

15 mg (n is a mixture of 2–5)

Sodium chloride 50 mg

Other additives were: matting agent (7 mg) consisting of polymethyl methacrylate (average particle size, 5 μm); and colloidal silica (70 mg) having an average particle size of 0.013 μm. Also added was a hardener composed of 35% formalin (2 ml) and 40% aqueous glyoxal (1.5 ml).

(iv) Evaluating samples

The samples prepared were subjected to a storage test under the following conditions.

Storage Test 1. 23° C.×55% r.h.×3 d.
2. 50° C.×80% r.h.×3 d.
3. 55° C.×20% r.h.×3 d.

Each of the samples thus prepared was cut into test pieces 3.5 cm wide, onto which a wedge image was printed by exposure (10$^{-5}$ sec) under a xenon flash lamp through an interference filter (820 nm which corresponds to an emission wavelength of semiconductor laser). The exposed test pieces were processed with an X-ray automatic processor (KX-500) of Konica Corp. using XD 90 (the trade name of a developing solution for X-ray automatic processor produced by Konica Corp.) and XF (fixing solution). The temperature of the developing solution was held at 35° C.

The results are shown in Table 1, from which one can clearly see the effectiveness of the present invention.

Comparative dye 1

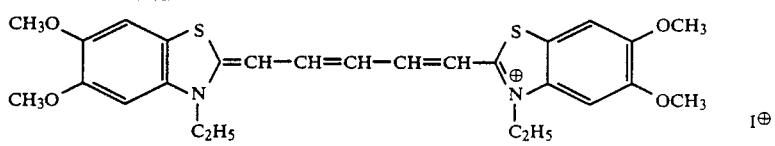

Comparative dye 2

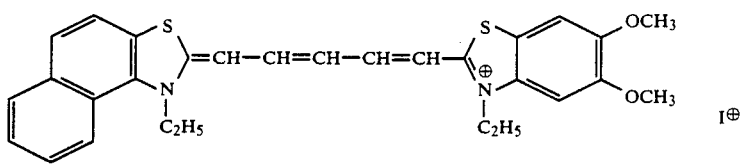

Comparative dye 3

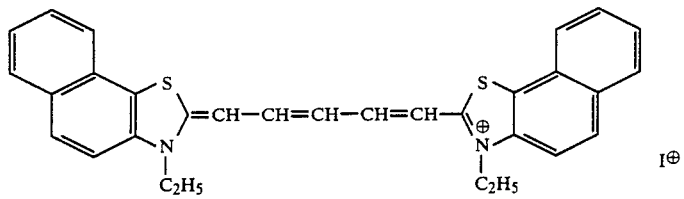

TABLE 1

| No. | Emulsion No. | Sensitizing dye (20 mg/mol AgX) | 23° C. × 55% r.h. × 3 d. fog | sensitivity | 50° C. × 80% r.h. × 3 d. fog | sensitivity | 55° C. × 20% r.h. × 3 d. fog | sensitivity | Remarks |
|---|---|---|---|---|---|---|---|---|---|
| 1 | 1-1 | comparison 1 | 0.02 | 52 | 0.03 | 24 | 0.07 | 42 | comparison |
| 2 | 1-1 | comparison 2 | 0.03 | 64 | 0.04 | 28 | 0.08 | 52 | |
| 3 | 1-1 | comparison 3 | 0.02 | 50 | 0.03 | 23 | 0.06 | 40 | |
| 4 | 1-1 | 11 | 0.01 | 100 | 0.02 | 55 | 0.04 | 82 | |
| 5 | 1-1 | 12 | 0.01 | 98 | 0.02 | 50 | 0.04 | 81 | |
| 6 | 1-1 | 13 | 0.01 | 102 | 0.02 | 57 | 0.04 | 90 | |
| 7 | 1-2 | comparison 1 | 0.02 | 56 | 0.03 | 30 | 0.06 | 48 | |
| 8 | 2-1 | comparison 1 | 0.02 | 54 | 0.03 | 28 | 0.06 | 47 | |
| 9 | 2-2 | comparison 1 | 0.02 | 60 | 0.03 | 33 | 0.06 | 54 | |
| 10 | 1-2 | 11 | 0.01 | 130 | 0.01 | 120 | 0.02 | 126 | within the |
| 11 | 1-2 | 12 | 0.01 | 127 | 0.01 | 119 | 0.01 | 124 | invention |
| 12 | 1-2 | 13 | 0.01 | 133 | 0.01 | 122 | 0.01 | 130 | |
| 13 | 2-1 | 11 | 0.01 | 126 | 0.01 | 112 | 0.02 | 122 | |
| 14 | 2-1 | 12 | 0.01 | 124 | 0.01 | 110 | 0.02 | 120 | |
| 15 | 2-1 | 13 | 0.01 | 130 | 0.01 | 115 | 0.02 | 126 | |
| 16 | 2-2 | 7 | 0.02 | 110 | 0.02 | 105 | 0.02 | 108 | |
| 17 | 2-2 | 8 | 0.02 | 128 | 0.02 | 124 | 0.02 | 127 | |
| 18 | 2-2 | 9 | 0.02 | 130 | 0.02 | 126 | 0.02 | 129 | |
| 19 | 2-2 | 10 | 0.02 | 128 | 0.02 | 125 | 0.02 | 128 | |
| 20 | 2-2 | 11 | 0.01 | 135 | 0.01 | 130 | 0.01 | 133 | |
| 21 | 2-2 | 12 | 0.01 | 132 | 0.01 | 130 | 0.01 | 132 | |
| 22 | 2-2 | 13 | 0.01 | 137 | 0.01 | 133 | 0.01 | 136 | |
| 23 | 2-2 | 14 | 0.02 | 130 | 0.02 | 127 | 0.02 | 130 | |
| 24 | 2-2 | 24 | 0.02 | 120 | 0.02 | 118 | 0.02 | 119 | |
| 25 | 2-2 | 29 | 0.02 | 125 | 0.02 | 123 | 0.02 | 124 | |

EXAMPLE 2

As in Example 1, grains were grown from seed T-2 and emulsions 3-8 were prepared in the same manner except that gelatinous flocculant G-3 used in desalting method (b) was replaced by G-1, G-2, G-5, G-7, G-8 and G-11. Emulsions 9-12 were also prepared as in Example 1 except that gelatinous flocculant G-3 used in an amount of 50 g per mole of AgX was replaced by P-1, P-3, P-6 and P-7 each being used in an amount of 1 g per mole of AgX. Photographic samples were prepared from these emulsions as in Example 1 and evaluated in the same way. The results are shown in Table 2.

EXAMPLE 3

A solution (1 L) was prepared from potassium bromide (130 g), pottassium iodide (2.5 g), 1-phenyl-5-mercaptotetrazole (30 mg) and gelatin (15 g). To the stirred solution at 40° C., a solution (500 ml) containing 0.5M ammoniacal silver nitrate was added in one minute. Two minutes after the addition of this solution, acetic acid was added to adjust the pH of the mixture to 6.0. One minute later, a solution (500 ml) containing 0.5M silver nitrate was added in one minute and the mixture was stirred for 15 minutes. Then, an aqueous solution containing the product of condensation of sodium naphthalenesulfonate with formaldehyde and magnesium sulfate was added to flocculate the emulsion. After removing the supernatant, 2 L of warm water (40° C.) was added and the mixture was stirred for 10 minutes.

TABLE 2

| No. | Emulsion No. | Flocculant | Sensitizing dye (20 mg/mol AgX) | 23° C. × 55% r.h. × 3 d. fog | sensitivity | 50° C. × 80% r.h. × 3 d. fog | sensitivity | 55° C. × 20% r.h. × 3 d. fog | sensitivity | Remarks |
|---|---|---|---|---|---|---|---|---|---|---|
| 26 | 3 | G-1 | 13 | 0.01 | 135 | 0.01 | 132 | 0.01 | 134 | within the |
| 27 | 4 | G-2 | 13 | 0.01 | 130 | 0.01 | 128 | 0.01 | 130 | invention |
| 28 | 5 | G-5 | 13 | 0.01 | 132 | 0.01 | 129 | 0.01 | 131 | |
| 29 | 6 | G-7 | 13 | 0.01 | 130 | 0.01 | 127 | 0.01 | 131 | |
| 30 | 7 | G-8 | 13 | 0.01 | 134 | 0.01 | 132 | 0.01 | 133 | |
| 31 | 8 | G-11 | 13 | 0.01 | 132 | 0.01 | 130 | 0.01 | 131 | |
| 32 | 9 | P-1 | 13 | 0.02 | 131 | 0.02 | 128 | 0.02 | 130 | |
| 33 | 10 | P-3 | 13 | 0.02 | 135 | 0.02 | 131 | 0.02 | 134 | |
| 34 | 11 | P-6 | 13 | 0.02 | 130 | 0.02 | 126 | 0.02 | 130 | |
| 35 | 12 | P-7 | 13 | 0.02 | 132 | 0.02 | 129 | 0.02 | 131 | |

As is clear from Table 2, the effectiveness of the present invention was also proved in Example 2.

Thereafter, another aqueous solution of magnesium sulfate was added to flocculate the emulsion. After removing the supernatant, a 5% gelatin solution (300 ml) was added and the mixture was stirred at 55° C. for 30 minutes to prepare an emulsion. The grains in this emulsion had an average size of 0.40 μm and 90% of them had sizes within the range of 0.2–0.7 μm.

To the resulting emulsion, ammonium thiocyanate, chloroauric acid and sodium thiosulfate were added to effect gold-sulfur sensitization.

To the sensitized emulsion, a compound of formula (1) (for its name, see Table 3 below) was added as a spectral sensitizing dye. Thereafter, 4-hydroxy-6-methyl-1,3,3a,7-tetrazaindene was added in an amount of 1.0 g per mole of silver halide.

A coating solution of backing layer was prepared from gelatin (400 g), polymethyl methacrylate (2 g), sodium dodecylbenzene-sulfonate (6 g), antihalation dye I (20 g) and glyoxal. Also prepared was a 10 wt % diluted aqueous dispersion of a terpolymer composed of glycidyl methacrylate (50 wt %), methyl acrylate (10 wt %) and butyl methacrylate (40 wt %). This dispersion was coated onto a polyethylene terephthalate base to form a subbing layer. On one side of this subbed base, the coating solution of backing layer was applied together with a coating solution of protective layer that was composed of gelatin, matting agent, sodium dodecylbenzenesulfonate and glyoxal. The coating weights of the backing layer and protective layer were 2.5 g/m² and 2.0 g/m², respectively, in terms of gelatin deposit.

To the so prepared base support having a backing layer, coating solutions for emulsion and protective layer were applied as follows to prepare coated photographic samples.

Preparing coated samples

After adding a compound of formula (3) and/or a compound of formula (4) (for their names, see Table 3 below), the following compounds were added to prepare coating solutions of emulsion.

| Compound | Amount (per mole of silver halide) |
|---|---|
| Trimethylolpropane | 10 g |
| Nitrophynyl-triphenylphosphonium chloride | 50 mg |
| Ammonium 1,3-dihydroxybenzene-4-sulfonate | 1 g |
| Sodium 2-mercaptobenzimidazole-5-sulfonate | 10 mg |
| 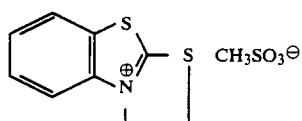 | 35 mg |
| 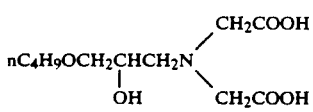 | 1 g |
| 1,1-Dimethylol-1-bromo-1-nitromethane | 10 mg |

| Compound | Amount (per mole of silver halide) |
|---|---|
|  | 100 mg |

The following compounds were added as additives for protective layer.

| Compound | Amount (per mole of silver halide) |
|---|---|
| CH₂COO(CH₂)₉CH₃<br>\|<br>CHCOO(CH₂)₂CH(CH₃)₂<br>\|<br>SO₃Na | 20 mg |
| $C_8F_{17}SO_2N$—(CH₂CH₂O)₇₄—(CH₂)₄—SO₃Na with C₃H₇ branch | 2 mg |
| $C_9F_{17}O$—⌬—COO(CH₂CH₂O)₁₂—H | 1 mg |
| $C_8F_{17}SO_3K$ | 5 mg |
| $C_{16}H_{33}O$—(CH₂CH₂O)₁₂—H | 5 mg |
| [C₁₂H₂₅—phenyl—CH₂—phenyl—O—(CH₂CH₂O)₁₁—H]₂.₃ | 10 mg |

Other additives were: matting (7 mg) composed of silica having an average particle size of 7 μm; colloidal silica (70 mg) having an average particle size of 0.013 μm; and sodium chloride (2 mg). Also added was a hardener composed of formaldehyde and glyoxal.

The coating solutions thus prepared were applied simultaneously to the base by a slide hopper method in such a way that a protective layer would form in superposition on a silver halide emulsion layer. The coating speed was 60 m/min. The silver deposit was 2.5 g/m², and the gelatin deposit was 3 g/m² for the emulsion layer and 1.3 g/m² for the protective layer.

Each of the coated samples thus prepared was stored for 3 days in a humidified atmosphere (55% r.h.) at 23° C. to stabilize the hardened layers. Tehreafter, the samples were exposed under a semiconductor laser (800 nm) with the quantity of light being varied in $10^{-5}$ sec per pixel (100 μm²), and subsequently processed with an X-ray automatic processor (SRX-501) of Konica Corp within a total processing time of 45 seconds, using XD-SR (the trade name of a developing solution for X-ray automatic processor produced by Konica Corp.)

and XF-SR (fixing solution). The temperature of the developing solution was held at 35° C.

The processed samples were evaluated for sensitivity and fogging. Sensitivity was expressed by the common logarithm of the reciprocal of exposure necessary to provide a density of "fog +1.0" and the results were indicated in terms of relative values, with the value for sample No. 101 being taken as 100.

Another group of virgin samples were treated in the following way. Each of them was cut into test pieces measuring 10 cm × 30 cm and subjected to overall exposure under a semiconductor laser (800 nm) with the quantity of light being adjusted to provide a density of 1.0 after development. The exposed samples were developed as in the sensitometric experiment within a total processing time of 45 seconds. The graininess of the image obtained was evaluated with the eye by the following criteria: 1, completely satisfactory; 2, somewhat deteriorated but still acceptable; 3, poor; 4, totally unacceptable. The results are shown in Table 3, from which one can see that the samples prepared in accordance with the present invention had high sensitivity, experienced low fog, and ensured good graininess even after rapid access photography for a total processing time of 45 seconds was performed.

TABLE 3

| Sample No. | Formula (2)* compound No. | amount | Formula (3)** compound No. | amount | Formula (4)** compound No. | amount | Fog | Sensitivity | Dmax | Graininess | Remarks |
|---|---|---|---|---|---|---|---|---|---|---|---|
| 101 | 37 | 20 mg | — | — | — | — | 0.06 | 100 | 3.57 | 4 | comparison |
| 102 | 38 | 20 mg | — | — | — | — | 0.06 | 105 | 3.60 | 3 | comparison |
| 103 | 40 | 20 mg | — | — | — | — | 0.05 | 120 | 3.55 | 4 | comparison |
| 104 | 40 | 20 mg | 6 | 1.0 | — | — | 0.03 | 118 | 3.52 | 2 | invention |
| 105 | 40 | 20 mg | 10 | 1.0 | — | — | 0.02 | 119 | 3.50 | 2 | invention |
| 106 | 40 | 20 mg | 13 | 1.0 | — | — | 0.02 | 120 | 3.51 | 1 | invention |
| 107 | 40 | 20 mg | — | — | 16 | 1.0 | 0.02 | 117 | 3.53 | 1 | invention |
| 108 | 40 | 20 mg | — | — | 17 | 1.0 | 0.03 | 115 | 3.52 | 2 | invention |
| 109 | 40 | 20 mg | — | — | 19 | 1.0 | 0.03 | 112 | 3.59 | 2 | invention |
| 110 | 40 | 20 mg | 13 | 0.5 | 16 | 0.5 | 0.02 | 117 | 3.55 | 1 | invention |
| 111 | 38 | 20 mg | 13 | 1.0 | — | — | 0.02 | 109 | 3.60 | 2 | invention |
| 112 | 38 | 20 mg | — | — | 16 | 1.0 | 0.03 | 103 | 3.57 | 2 | invention |
| 113 | 38 | 20 mg | 13 | 0.5 | 16 | 0.5 | 0.02 | 104 | 3.53 | 2 | invention |

*The amount in which compound of formula (2) was added is based on one mole of silver halide.
**The amount in which compound of formula (3) or (4) was added is based on one gram of gelatin.

As is clear from Table 3, the samples prepared in accordance with the present invention experienced low fog, had high sensitivity and insured good graininess.

EXAMPLE 4

Sample Nos. 106 and 107 prepared in Example 3 were exposed as in Example 3 but subsequently processed with the total provessing time being varied as shown in Table 4. The results of evaluation conducted on the processed samples concerning sensitivity, fog and graininess are summarized in Table 4. Sensitivity is expressed in terms of relative values, with the value for sample No. 107 being taken as 100. As one can see from Table 4, the photographic samples prepared in accordance with the present invention produced satisfactory image regardless of the duration of processing time. Particularly good graininess was attained for total processing times within the range of 20 seconds or more but less than 60 seconds.

TABLE 4

| Run No. | Sample No. | Total processing time (sec) | Fog | Sensitivity | Graininess |
|---|---|---|---|---|---|
| 1 | 106 | 18 | 0.02 | 65 | 2 |
| 2 | 107 | 18 | 0.02 | 67 | 2 |

TABLE 4-continued

| Run No. | Sample No. | Total processing time (sec) | Fog | Sensitivity | Graininess |
|---|---|---|---|---|---|
| 3 | 106 | 20 | 0.02 | 90 | 1 |
| 4 | 107 | 20 | 0.02 | 93 | 2 |
| 5 | 106 | 30 | 0.02 | 95 | 1 |
| 6 | 107 | 30 | 0.02 | 98 | 1 |
| 7 | 106 | 45 | 0.02 | 100 | 1 |
| 8 | 107 | 45 | 0.02 | 105 | 1 |
| 9 | 106 | 60 | 0.04 | 110 | 2 |
| 10 | 107 | 60 | 0.05 | 112 | 1 |
| 11 | 106 | 70 | 0.08 | 85 | 2 |
| 12 | 107 | 70 | 0.10 | 83 | 2 |

EXAMPLE 5

Preparing emulsion coating solution

An aqueous solution containing sodium chloride and potassium bromide (containing 23.9 mg of pentabromorhodium potassium salt per 60 g of silver nitrate) and an aqueous solution of silver nitrate were added simultaneously to an aqueous gelatin solution under stirring at 40° C. over a period of 25 minutes, thereby preparing a silver chlorobromide emulsion having an average grain size of 0.20 μm.

To this emulsion, 200 mg of 6-methyl-4-hydroxy-1,3,3a,7-tetrazaindene was added as a stabilizer, followed by washing with water and desalting.

To the desalted emulsion, 20 mg of 6-methyl-4-hydroxy-1,3,3a,7-tetrazaindene was added. After sulfur sensitization, 6-methyl-4-hydroxy-1,3,3a,7-tetrazaindene was further added as a stabilizer and the mixture was worked up with water to prepare an emulsion in a total volume of 260 ml.

Subsequently, a compound of formula (2) (for its name, see Table 5) was added as a sensitizing dye, and a compound of formula (3) and/or a compound of formula (4) was also added. Thereafter, the following additives were added successively: $0.4 \times 10^{-3}$ mol/mol Ag of a tetrazolium compound (T) to be identified below (as a contrast increasing agent); a 20% aqueous solution of saponin (5 ml per mole of silver halide); sodium dodecylbenzenesulfonate (180 mg per mole of silver halide); 5-methyl benzotriazole (80 mg per mole of silver halide); a latex solution (43 ml per mole of silver halide); compound M to be identified below (60 mg per mole of silver halide); and a water-soluble styrene-maleic acid copolymer as a thickener (280 mg per mole of silver halide). The mixture was worked up with water to make an emulsion coating solution in a total volume of 475 ml.

Preparing coating solution for protective layer of emulsion:

Gelatin (1 kg) was swelled by addition of pure water (10 L) and dissolved at 40° C. Subsequently, the following additives were added successively: 2.9 L of a 1% aqueous solution of compound Z (sec below) as a coating aid; 80 g of compound N (see below) as a filter dye; 20 g of amorphous silica (average particle size, 8 μm) and 10 g of amorphous silica (average particle size, 3 μm) as matting agents; 62 g of compound B (see below); and 5 g of compound A (see below). The pH of the mixture was adjusted to 5.4 with an aqueous solution of citric acid. Thereafter, the mixture was worked up with water to make coating solution P-1 for protective layer of emulsion in a total volume of 17 L.

Preparing coating solution of backing layer

Gelatin (36 kg) was swelled by addition of water and dissolved under heating. Aqueous solutions containing 1.6 kg of dye compound C-1 (see below) and 2.9 kg of compound N were respectively added. Thereafter, 11 L of a 20% aqueous solution of saponin and 5 kg of compound C-2 to be identified below (as an agent to control physical properties) were added. To the mixture, 63 g of compound C-3 (see below) and 270 g of compound C-4 were added as methanol solutions. To the resulting solution, 800 g of a watr-soluble styrene-maleic acid copolymer was added as a thickener to adjust viscosity. The pH of the solution was adjusted to 5.4 with an aqueous solution of citric acid. Finally, 144 g of glyoxal was added and the mixture was worked up with water to make coating solution B-1 of backing layer in a total volume of 960 L.

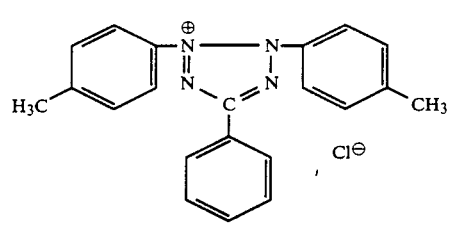
Compound T

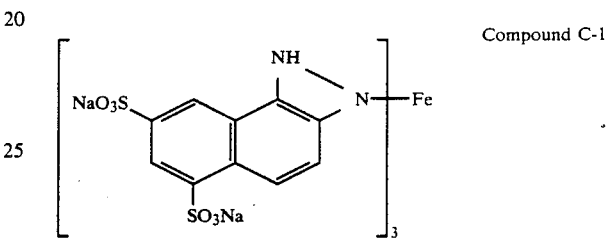
Compound C-1

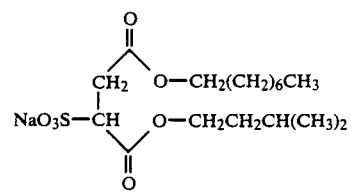
Compound Z

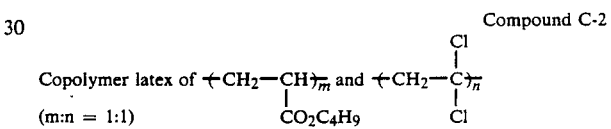
Compound C-2

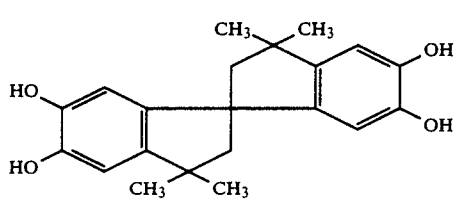
Compound M

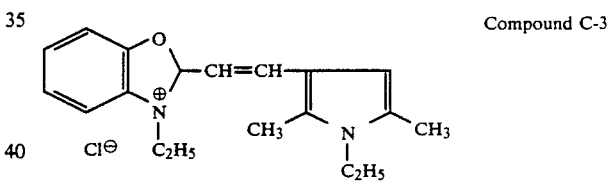
Compound C-3

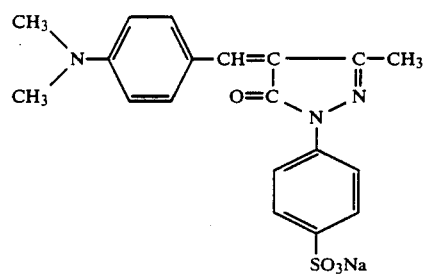
Compound N

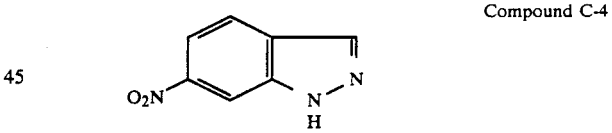
Compound C-4

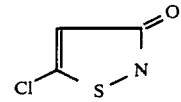
Compound A

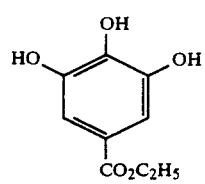
Compound B

In the next step, a coating solution of a protective layer for the backing layer was prepared by the following procedures.

Preparing coating solution of protective layer for the backing layer

Gelatin (50 kg) was swelled by addition of water and dissolved under heating. To the solution, 340 g of a sodium salt of bis (2-ethylhexyl) 2-sulfosuccinate was added, followed by addition of 1.7 kg of polymethyl methacrylate (average particle size, ca. 0.4 μm) as a matting agent, and 540 g of mucochloric acid. The mixture was worked up with water to prepare coating solution P-2 for backing protective layer in a total volume of 1,000 L.

Preparing samples to be evaluated

The coating solutions thus prepared were applied to both sides of a subbed polyethylene terephthalate film (100 μm thick) in the following way to make samples for evaluation. The base film was of the type described in Example 3 in the specification of JP-A-59-09941.

Backing coating solution B-1 was applied to one side of the subbed base support to form an undercoat of the backing layer having a dry gelatin weight of 2 g/m². At the same time, coating solution P-2 was applied in superposition on the undercoat to form a backing protective layer having a dry gelatin weight of 1 g/m². In the next step, the emulsion coating solution was applied to the other side of the base in such a way that the dry gelatin weight would be 1.8 g/m², with a silver deposit of 4.3 g/m². At the same time, coating solution P-1 was applied in superposition on the emulsion layer to form an emulsion protective layer, with formaldehyde being added as a hardener, so that the dry gelatin weight would be 0.8 g/m².

The so prepared samples to be evaluated were exposed as in Example 3 and subsequently processed at 35° C. for 50 seconds with a developing and a fixing solution having the recipes shown below. The results of evaluation that was conducted on the processed samples for sensitivity, fog and graininess are summarized in Table 5.

TABLE 5

| Sample No. | Formula (2) compound No. | amount (mg) | Formula (3) compound No. | amount (mg) | Formula (4) compound No. | amount (mg) | Fog | Sensitivity | Graininess | Remarks |
|---|---|---|---|---|---|---|---|---|---|---|
| (1) | 37 | 45 | — | — | — | — | 0.03 | 100 | 4 | comparison |
| (2) | 38 | 45 | — | — | — | — | 0.02 | 102 | 4 | comparison |
| (3) | 40 | 45 | — | — | — | — | 0.03 | 101 | 3 | comparison |
| (4) | 40 | 45 | 10 | 1.0 | — | — | 0.01 | 110 | 1 | invention |
| (5) | 40 | 45 | 13 | 1.0 | — | — | 0.01 | 115 | 1 | invention |
| (6) | 40 | 45 | — | — | 16 | 1.0 | 0.01 | 109 | 1 | invention |
| (7) | 40 | 45 | — | — | 17 | 1.0 | 0.01 | 114 | 1 | invention |
| (8) | 40 | 45 | 13 | 0.5 | 16 | 0.5 | 0.01 | 112 | 1 | invention |

The data in Table 5 shows that the samples prepared in Example 5 in accordance with the present inventions were as effective as those prepared in Example 3 and that they experienced low fog, had high sensitivity and insured good graininess.

Sensitivity was expressed in terms of relative values, with the value for coated sample No. 1 being taken as 100.

| Recipes of developing solution | |
|---|---|
| Composition A | |
| Pure water (ion-exchanged water) | 150 ml |
| Ethylenediaminetetraacetic acid disodium salt | 2 g |
| Diethylene glycol | 50 g |
| Potassium sulfite (55% w/v aq. sol.) | 100 ml |
| Potassium carbonate | 50 g |
| Hydroquinone | 15 g |
| 5-Methylbenzotriazole | 200 mg |
| 1-Phenyl-5-mercaptotetrazole | 30 mg |
| Potassium hydroxide | q. s. to adjust the pH of solution to 10.4 |
| Potassium bromide | 4.5 g |
| Composition B | |
| Pure water (ion-exchanged water) | 3 ml |
| Diethylene glycol | 50 g |
| Ethylenediaminetetraacetic acid disodium salt | 25 mg |
| Acetic acid (90% aq. sol.) | 0.3 ml |
| 5-Nitroindazole | 110 mg |
| 1-Phenyl-3-pyrazolidone | 500 mg |

Just prior to use, compositions A and B were successively dissolved in 500 ml of water and worked up to a total volume of 1,000 ml.

| Recipes of fixing solution | |
|---|---|
| Composition A | |
| Ammonium thiosulfate (72.5% w/v aq. sol.) | 230 ml |
| Sodium sulfite | 9.5 g |
| Sodium acetate (3H₂O) | 15.9 g |
| Boric acid | 6.7 g |
| Sodium citrate (2H₂O) | 2.0 g |
| Acetic acid (90% w/v aq. sol.) | 8.1 ml |
| Composition B | |
| Pure water (ion-exchanged water) | 17 ml |
| Nitric acid (50% w/v aq. sol.) | 5.8 g |
| Aluminum sulfate (aq. sol. with Al₂O₃ content of 8.1% w/w) | 26.5 g |

Just prior to use, compositions A and B were successively dissolved in 500 ml of water and worked up to a total volume of 1,000 ml. The so prepared fixing solution had a pH of ca. 4.3.

What is claimed is:

1. A silver halide photographic material that contains at least one compound represented by the general formula (2) shown below and at least one compound selected from the group consisting of the compounds represented by the general formulas (3) and (4) shown below:

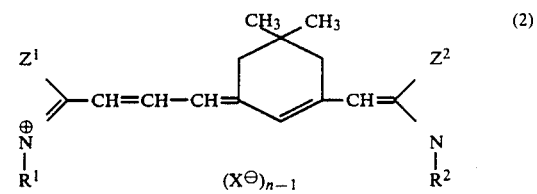

where $Z^1$ represents the non-metallic atomic group necessary to form an optionally substituted benzothiazole, benzoxazole, naphthothiazole or naphthoxazole nucleus; $Z^2$ represents the non-metallic atomic group necessary to form an optionally substituted benzothiazole nucleus; $R^1$ and $R^2$ each independently represents an alkyl group having 1–4 carbon atoms, a substituted alkyl group or anryl group; $X^\ominus$ is an anion; n is 1 or 2 and when an intramolecular salt is formed, n is 1;

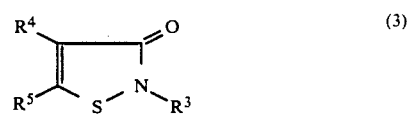

where $R^3$ represents a hydrogen atom, a straight-chained or branched alkyl group, a cyclic alkyl group, an alkenyl group, an aralkyl group, an aryl group, a heterocyclic group, an alkylamido group, an arylamido group, an alkylthioamido group, an arylthioamido group, an alkylsulfamido group or an arylsulfamido group; $R^4$ and $R^5$ each independently represents a hydrogen atom, a halogen atom, an alkyl group, a cyclic alkyl group, an aryl group, a cyano group, an alkylthio group, an arylthio group, an alkylsulfoxide group, an alkylsulfonyl group, or a heterocyclic group;

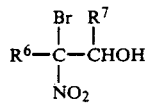
(4)

where $R^6$ is a hydrogen atom, a lower alkyl group or a hydroxymethyl group; and $R^7$ is a hydrogen atom or a lower alkyl group.

2. A silver halide photographic material according to claim 1 wherein the compound represented by the general formula (2) is used in an amount of 0.003-0.3 g per mole of silver halide.

3. A silver halide photographic material according to claim 1 wherein the compound represented by the general formula (2) is used in an amount of 0.01-0.15 g per mole of silver halide.

4. A silver halide photographic material according to claim 1 wherein the compound represented by the general formula (2) is added during chemical ripening.

5. A silver halide photographic material according to claim 1 wherein the compound represented by the general formula (3) is a compound represented by the following general formula (3-1) or (3-2):

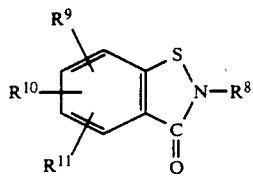
(3-1)

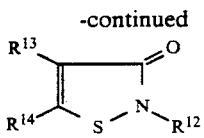
(3-2)

where $R^8$ is a hydrogen atom, an alkyl group or an alkoxy group; $R^9$, $R^{10}$ and $R^{11}$ each represents a hydrogen atom, a halogen atom, an alkyl group, an alkoxy group, a cyano group or a nitro group; $R^{12}$ represents a hydrogen atom, an alkyl group, a cyclic alkyl group, an alkenyl group, an aralkyl group, an aryl group, —CONHR$^{15}$ (where $R^{15}$ is an alkyl group, an aryl group, an alkylthio group, an arylthio group, an alkylsulfonyl group or an arylsulfonyl group) or a heterocyclic group; $R^{13}$ and $R^{14}$ each represents a hydrogen atom, a halogen atom, an alkyl group, a cyclic alkyl group, an aryl group, a heterocyclic group, a cyano group, an alkylthio group, an arylthio group, an alkylsulfoxide group, an alkylsulfinyl group, an alkylsulfonyl group or a heterocyclic group.

6. A silver halide photographic material according to claim 5 wherein the compound represented by the general formula (3-1) is incorporated in an amount ranging from $1 \times 10^{-5}$ to 10 wt % of a hydrophilic colloid.

7. A silver halide photographic material according to claim 5 wherein the compound represented by the general formula (3-1) is incorporated in an amount ranging from $1 \times 10^{-4}$ to 1 wt % of a hydrophilic colloid.

8. A silver halide photographic material according to claim 5 wherein the compound represented by the general formula (3-2) is incorporated in an amount ranging from $1 \times 10^{-4}$ to 10 wt % of a hydrophilic colloid.

9. A silver halide photographic material according to claim 5 wherein the compound represented by the general formula (3-2) is incorporated in an amount ranging from $3 \times 10^{-4}$ to 1 wt % of a hydrophilic colloid.

10. A silver halide photographic material according to claim 1 wherein the compound represented by the general formula (4) is incorporated in an amount ranging from $1 \times 10^{-5}$ to 10 wt % Of a hydrophilic colloid.

11. A silver halide photographic material according to claim 1 wherein the compound represented by the general formula (4) is incorporated in an amount ranging from $1 \times 10^{-4}$ to 1 wt % of a hydrophilic colloid.

* * * * *

UNITED STATES PATENT AND TRADEMARK OFFICE
CERTIFICATE OF CORRECTION

PATENT NO. : 5,059,516
DATED : October 22, 1991
INVENTOR(S) : Kiyoshi SATO et al.

It is certified that error appears in the above-indentified patent and that said Letters Patent is hereby corrected as shown below:

Claim 1, column 51, line 18, change "$^1$s" to --is--.

Claim 10, column 52, line 41, change "Of" to --of--.

Abstract, formula (2) change,

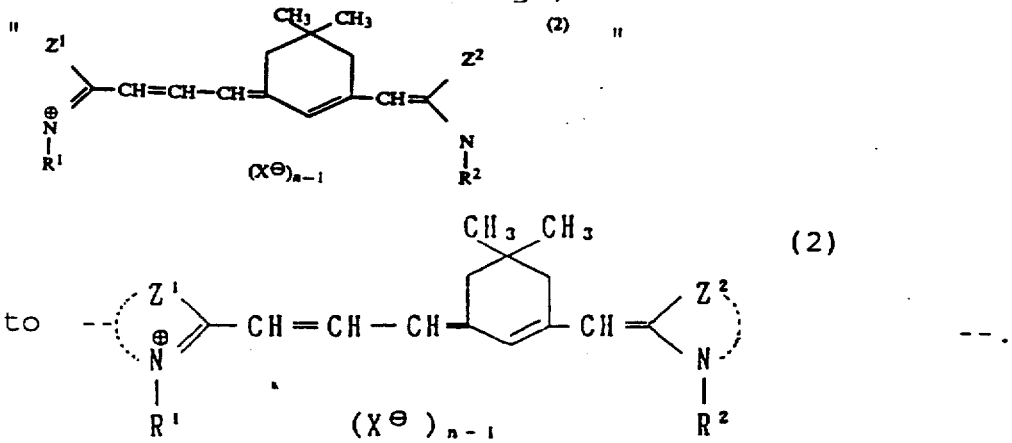

Column 2, formula (1), line 35, change

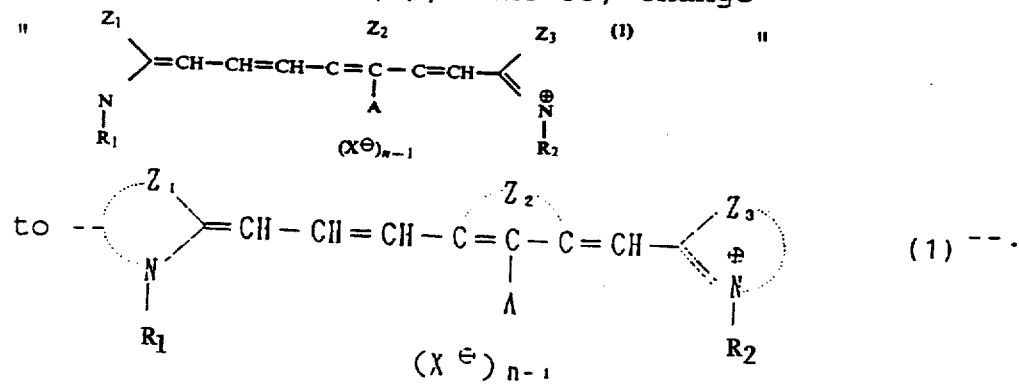

UNITED STATES PATENT AND TRADEMARK OFFICE
CERTIFICATE OF CORRECTION

PATENT NO. : 5,059,516
DATED : October 22, 1991
INVENTOR(S) : Kiyoshi SATO et al.

It is certified that error appears in the above-indentified patent and that said Letters Patent is hereby corrected as shown below:

Column 2, formula (1a), line 53, change,

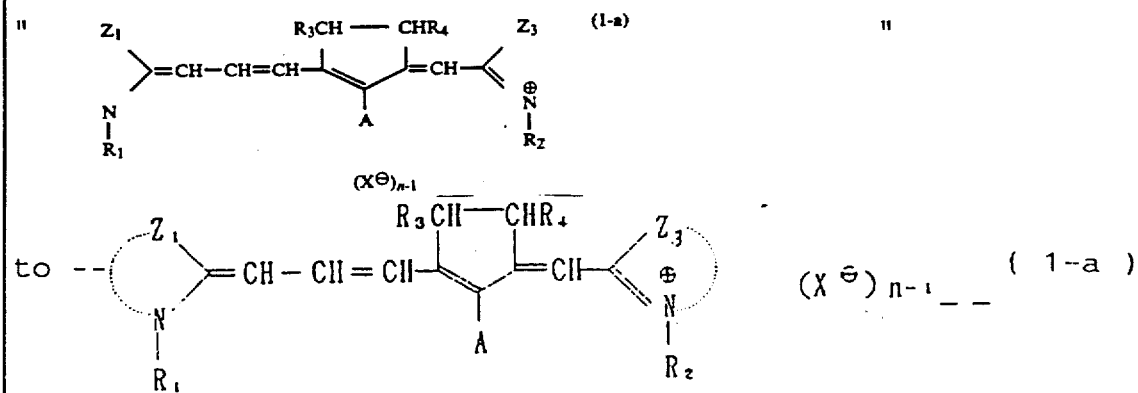

Column 3, formula (1b), line 12, change,

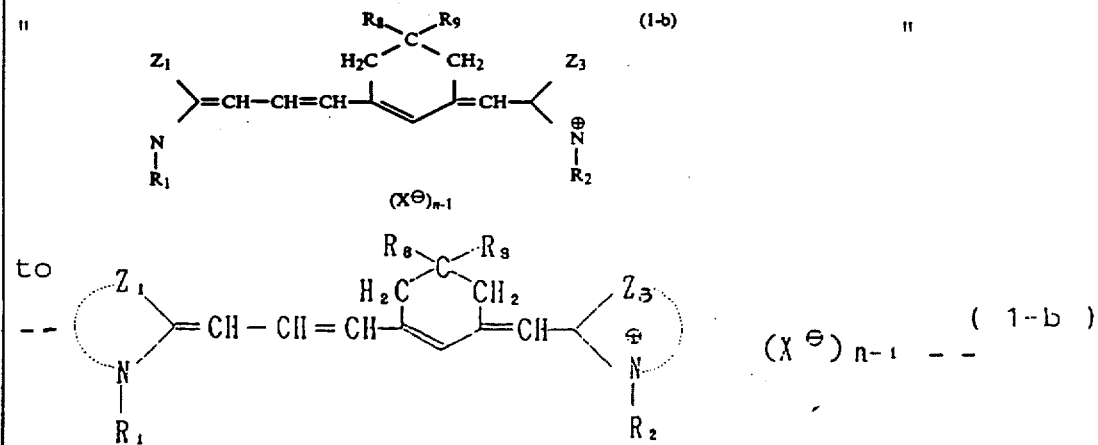

UNITED STATES PATENT AND TRADEMARK OFFICE
CERTIFICATE OF CORRECTION

Page 3 of 4

PATENT NO. : 5,059,516
DATED : October 22, 1991
INVENTOR(S) : Kiyoshi SATO et al.

It is certified that error appears in the above-indentified patent and that said Letters Patent is hereby corrected as shown below:

Column 3, formula (2), line 27, change,

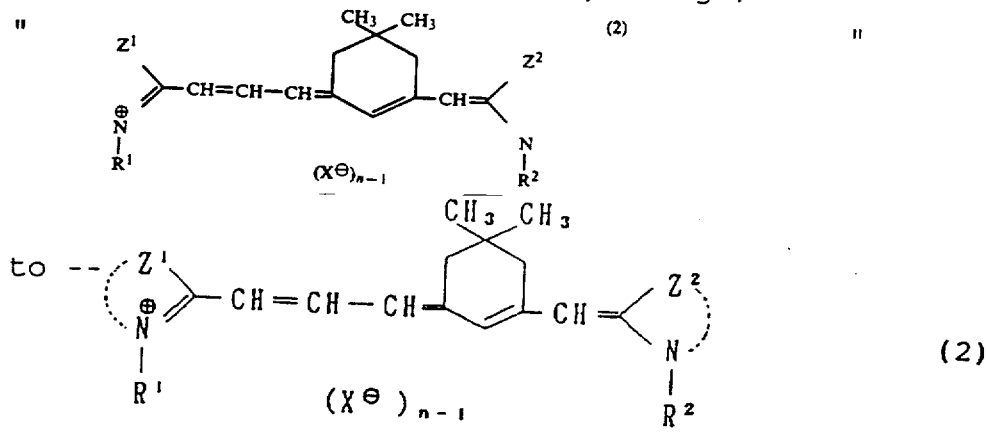

UNITED STATES PATENT AND TRADEMARK OFFICE
CERTIFICATE OF CORRECTION

PATENT NO. : 5,059,516
DATED : October 22, 1991
INVENTOR(S) : Kiyoshi Sato, et. al.

It is certified that error appears in the above-indentified patent and that said Letters Patent is hereby corrected as shown below:

Column 50, formula (2), line 45, change,

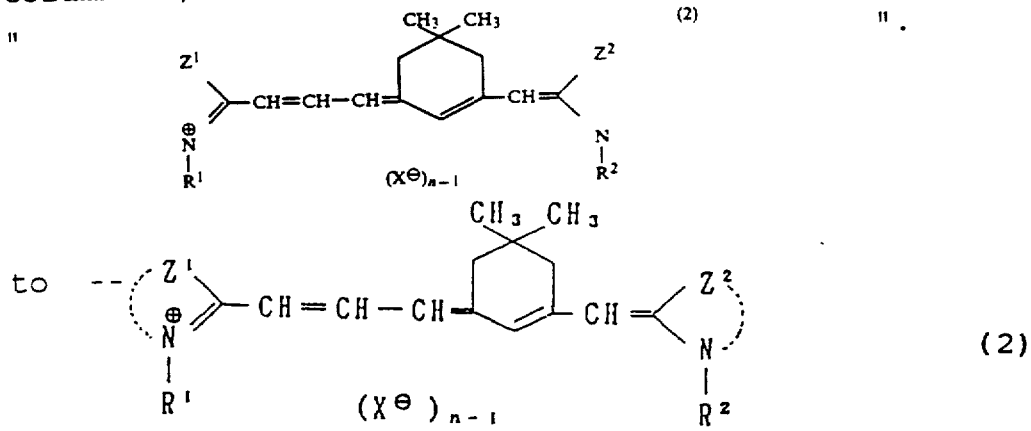

Signed and Sealed this

Thirtieth Day of May, 1995

Attest:

BRUCE LEHMAN

Attesting Officer    Commissioner of Patents and Trademarks